United States Patent
Chen et al.

(10) Patent No.: US 11,725,071 B2
(45) Date of Patent: Aug. 15, 2023

(54) COPOLYMERS OF HALOGENATED OLEFINS AND HALOGENATED CO-MONOMERS

(71) Applicant: Arkema Inc., King of Prussia, PA (US)

(72) Inventors: Benjamin Bin Chen, Wayne, PA (US); Caiping Lin, West Hartford, CT (US); Craig A. Polsz, Newtown, PA (US); Kurt A. Wood, Abington, PA (US); Brian T. Wood, King of Prussia, PA (US); Lucy Clarkson, Chadds Ford, PA (US)

(73) Assignee: Arkema Inc., King of Prussia, PA (US)

( * ) Notice: Subject to any disclaimer, the term of this patent is extended or adjusted under 35 U.S.C. 154(b) by 237 days.

(21) Appl. No.: 16/651,391

(22) PCT Filed: Sep. 25, 2018

(86) PCT No.: PCT/US2018/052559
§ 371 (c)(1),
(2) Date: Mar. 27, 2020

(87) PCT Pub. No.: WO2019/067398
PCT Pub. Date: Apr. 4, 2019

(65) Prior Publication Data
US 2020/0299433 A1 Sep. 24, 2020

Related U.S. Application Data

(60) Provisional application No. 62/563,742, filed on Sep. 27, 2017.

(51) Int. Cl.
| | |
|---|---|
| *C08F 214/18* | (2006.01) |
| *C08F 214/20* | (2006.01) |
| *C08F 214/22* | (2006.01) |
| *C08F 214/24* | (2006.01) |
| *C08F 214/26* | (2006.01) |
| *H01M 4/62* | (2006.01) |
| *C08F 220/22* | (2006.01) |

(52) U.S. Cl.
CPC ...... *C08F 214/184* (2013.01); *C08F 214/202* (2013.01); *C08F 214/222* (2013.01); *C08F 214/242* (2013.01); *C08F 214/262* (2013.01); *C08F 220/22* (2013.01); *H01M 4/623* (2013.01)

(58) Field of Classification Search
None
See application file for complete search history.

(56) References Cited

U.S. PATENT DOCUMENTS

| | | | | |
|---|---|---|---|---|
| 2,739,987 A | * | 3/1956 | Ruh | C07C 43/17 568/685 |
| 4,166,165 A | * | 8/1979 | Hisasue | C08F 210/02 526/87 |
| 5,266,639 A | | 11/1993 | Chapman, Jr. et al. | |
| 5,637,663 A | * | 6/1997 | Anolick | C09D 127/20 526/204 |
| 6,737,489 B2 | | 5/2004 | Linert et al. | |
| 7,700,700 B2 | * | 4/2010 | Wille | C08F 214/22 524/544 |
| 9,353,038 B2 | * | 5/2016 | Huang | C07C 41/24 |
| 9,458,272 B2 | | 10/2016 | Apostolo et al. | |
| 10,570,230 B2 | * | 2/2020 | Freeman | C08F 2/10 |
| 2003/0040591 A1 | * | 2/2003 | Shoichet | C07C 43/225 525/199 |
| 2005/0112379 A1 | | 5/2005 | Kim | |
| 2006/0154170 A1 | * | 7/2006 | Endo | G03F 7/0395 430/270.1 |
| 2008/0015298 A1 | * | 1/2008 | Xiong | C09D 127/12 524/451 |
| 2008/0149887 A1 | * | 6/2008 | Wang | C08F 214/20 524/610 |
| 2009/0124759 A1 | * | 5/2009 | Washino | C09K 3/1009 525/199 |
| 2009/0291222 A1 | | 11/2009 | Qiu et al. | |
| 2010/0068622 A1 | | 3/2010 | Wang et al. | |
| 2010/0304270 A1 | * | 12/2010 | Amin-Sanayei | H01M 4/0404 361/528 |
| 2014/0051805 A1 | * | 2/2014 | Shimada | D06M 15/29 524/850 |

(Continued)

FOREIGN PATENT DOCUMENTS

| CN | 104311756 A | 1/2015 |
|---|---|---|
| CN | 104311756 A | 1/2015 |

(Continued)

OTHER PUBLICATIONS

Alaaeddine Ali, et al; An Efficient Method to Synthesize Vinyl Ethers (VEs) That Bear Various halogenated or Functional Groups and Their Radical Copolymerization with Chlorothrifluoroethylene (CTFE) to Yield Functional POly (VE-alt-CTFE) Alternated Copolymers; Polymer Chemistry, 2013, vol. 4, pp. 4335-4347.

Journal of Fluorine Chemistry—Convenient Synthesis of 3,3,3 Trifluoropropanoic Acid by Hydrolytic Oxidation of 3,3,3,-Trifluorpropanal Dimethyl Acetal; Takeo Komata et al Journal of Flourine 129 (2008) 35-39.

A Novel & Convenient Synthesis of (Z)-3,3,3-Trufluoroproenyl Alkyl Ethers & CF3-Substituted Propyl Acetals as Versatile CF3-Containg Building Blocks Chem Comm 1996; Feng Hong et al—Shanghai Inst of Organic Chemisty pp. 57-58.

*Primary Examiner* — Nicole M. Buie-Hatcher
(74) *Attorney, Agent, or Firm* — David M. Weisberg

(57) ABSTRACT

Copolymers of one or more halogenated olefins and one or more halogenated co-monomers selected from the group consisting of halogenated alkenyl ethers, halogenated alkenyl esters, and halogenated (meth)acrylates are useful in various end-use applications wherein the presence of halogen (e.g., fluorine) in the copolymer imparts one or more desirable properties, as compared to analogous copolymers not containing halogen.

16 Claims, No Drawings

(56) References Cited

U.S. PATENT DOCUMENTS

| | | | |
|---|---|---|---|
| 2014/0296438 A1 | 10/2014 | Amin-Sanayei et al. | |
| 2015/0119523 A1 * | 4/2015 | Ameduri | C08F 214/182 |
| | | | 524/545 |
| 2016/0046746 A1 | 2/2016 | Ameduri et al. | |

FOREIGN PATENT DOCUMENTS

| | | | | |
|---|---|---|---|---|
| EP | 1035441 A1 * | 9/2000 | | G03F 7/0045 |
| FR | 3016634 A1 * | 7/2015 | | C08F 214/242 |
| JP | 2008255328 A2 | 10/2008 | | |
| WO | WO-2017091408 A1 * | 6/2017 | | C08F 259/08 |
| WO | 20190067394 A1 | 4/2019 | | |

* cited by examiner

COPOLYMERS OF HALOGENATED OLEFINS AND HALOGENATED CO-MONOMERS

This present application is the national phase under 35 USC § 371 of prior PCT International Application Number PCT/US2018/052559 filed Sep. 25, 2018 which designated the United States of America and claimed priority to U.S. Provisional Patent Application Ser. No. 62/563,742 filed Sep. 27, 2017.

FIELD OF THE INVENTION

The invention relates to copolymers of halogenated olefins and one or more halogenated co-monomers such as halogenated alkenyl ethers, halogenated alkenyl esters and halogenated (meth)acrylates, methods for making such copolymers and products comprising such copolymers.

BACKGROUND OF THE INVENTION

Halogenated polymers and copolymers have long been of commercial interest due to their generally superior weatherability, chemical resistance, and electrochemical stability as compared to non-halogenated analogous polymers and copolymers.

Examples include fluoropolymer-based coatings and films, which are widely used because of their outstanding properties. Often, these coatings and films are based not on fluoroolefin homopolymers, such as PVDF or PCTFE, but rather on copolymers containing two or more monomers (at least one of which is fluorinated). Illustrative copolymers of this type include copolymers of VF2 (vinylidene difluoride) such as those described in U.S. Pat. No. 5,925,705 and PCT Published Application WO 98/10000, U.S. Pat. No. 5,093,427 and PCT Published Application WO 98/38242, copolymers of TFE including ETFE, and copolymers of CTFE or TFE with vinyl ethers, vinyl esters, or allyl ethers or esters. In coating applications, these copolymers may additionally be blended with non-fluorinated co-resins; for example, coatings and films based on blends of VF2 homopolymer or copolymer, along with miscible acrylic resins, are well known for their outstanding outdoor weatherability properties, as well as other properties such as chemical resistance and formability.

Other classes of halogenated copolymers which are used in coatings are the so-called FEVE copolymers, which are alternating copolymers of CTFE or TFE with non-halogenated vinyl ethers, and the so-called fluoroacrylics, which are copolymers of (meth)acrylate monomers containing some degree of fluorination on their pendant side chains. FEVE copolymers are known for very good weatherability, high gloss, and their ease of use with various crosslinking chemistries. Fluoroacrylics are also commonly cross-linked and are well known for their antigraffiti and stain resistance properties.

Notwithstanding the halogenated polymers and copolymers known in the art, it would be desirable to develop new halogenated polymers and copolymers which have different or improved characteristics and properties.

BRIEF SUMMARY OF THE INVENTION

The present invention provides copolymers obtained by copolymerization of one or more halogenated olefins with one or more halogenated co-monomers selected from the group consisting of halogenated alkenyl ethers, halogenated alkenyl esters and halogenated (meth)acrylates. Accordingly, the present invention provides copolymers comprising, consisting essentially of, or consisting of, in polymerized form at least one halogenated olefin and at least one halogenated co-monomer selected from the group consisting of halogenated alkenyl ethers, halogenated alkenyl esters, and halogenated (meth)acrylates.

DETAILED DESCRIPTION OF CERTAIN EMBODIMENTS OF THE INVENTION

The copolymers of the present invention comprise, in polymerized form, at least one halogenated olefin and at least one halogenated co-monomer selected from the group consisting of halogenated alkenyl ethers, halogenated alkenyl esters and halogenated (meth)acrylates, wherein the particular halogenated olefin(s) and halogenated co-monomer(s) may be selected so as to impart desirable or improved properties to the copolymer obtained by polymerization of such monomers. It is, therefore, an object of this invention to provide improved polymeric compositions, preferably for coating, film, and sheet applications. It is another object of this invention to provide polymeric compositions having improved mechanical and physical properties. It is a further object of this invention to provide polymeric compositions which are highly resistant to abrasion, scratching, wear, staining, fouling and corrosion and to attack by chemicals and the like. It is still another object to provide improved polymeric compositions which are capable of shedding off dirt, grease, finger prints and the like. It is a still further object of this invention to provide polymeric compositions having improved UV resistance and/or improved weatherability. Another object of this invention is to provide a method for preparing polymeric compositions having improved properties.

The copolymer of the present invention contains, in polymerized form, at least one halogenated olefin. Suitable halogenated olefins include organic compounds containing a carbon-carbon double bond (C=C) and at least one halogen atom (F, Cl, Br, and/or I). As used herein, the term halogenated olefin excludes unsaturated compounds in which an ether or ester group (—C(=O)OR or —O—C(=O)R, where R is an organic moiety) is substituted on a carbon atom of the carbon-carbon double bond (e.g., alkenyl ethers, alkenyl esters and (meth)acrylates). One or both of the carbon atoms of the carbon-carbon double bond may be substituted with one or more halogen atoms. Where the halogenated olefin is comprised of three or more carbon atoms, one or more of the carbon atoms not part of the carbon-carbon double bond may be substituted with one or more halogen atoms. Halogen atoms may be substituted both on at least one carbon atom of the carbon-carbon double bond and at least one carbon atom other than the carbon atoms of the carbon-carbon double bonds. The halogenated olefin may contain a single type of halogen (e.g., only F). In other embodiments, the halogenated olefin may contain two or more different types of halogen (e.g., both F and Cl). In certain embodiments of the invention, the halogenated olefin does not contain any elements other than carbon, halogen and, optionally, hydrogen. The halogenated olefin may be aliphatic in character (i.e., the halogenated olefin does not contain any aromatic moieties). Particularly preferred halogenated olefins are those containing fluorine, especially those containing fluorine as the sole or principal halogen, for instance chlorofluoroethylene (VCF), tetrafluoroethylene (TFE), chlorotrifluoroethylene (CTFE), hexafluoropropylene (HFP), vinyl fluoride, vinylidene difluoride (VF2), and vinylidene trifluoride (VF3) and combinations thereof.

The halogenated olefin may contain one, two, three or more halogen atoms, such as bromine, chlorine, fluorine or iodine atoms or combinations thereof (e.g., at least one fluorine atom and at least one chlorine atom). In certain embodiments, the halogenated olefin is a fluorinated olefin. Suitable fluorinated olefins include olefins containing one, two, three or more fluorine (F) atoms. The fluorine atom(s) may be substituted on one or both of the carbon atoms involved in the carbon-carbon double bond and/or may be present as a substituent on a moiety, such as an alkyl group, that is attached to one or both of the carbon atoms involved in the carbon-carbon double bond. For example, the fluorinated olefin may comprise one or more fluoroalkyl (e.g., perfluoroalkyl) groups, such as fluoromethyl, difluoromethyl, trifluoromethyl, fluoroethyl, difluoroethyl, trifluoroethyl, tetrafluoroethyl, perfluoroethyl, fluoropropyl, difluoropropyl, trifluoropropyl, tetrafluoropropyl, pentafluoropropyl, hexafluoropropyl, perfluoropropyl and the like and analogues thereof wherein some of the fluorine atoms and/or one or more of the hydrogen atoms are replaced with other halogen atoms (e.g., Cl). The fluorinated olefin may comprise one or more halogen atoms other than fluorine, in particular one or more chlorine (Cl), iodine (I) and/or bromine (Br) atoms.

In certain embodiments of the invention, the halogenated olefin or fluorinated olefin may comprise at least one hydrogen atom substituted on a carbon atom involved in a carbon-carbon double bond. For example, fluoroolefins, hydrofluoroolefins, chloroolefins, hydrochloroolefins, chlorofluoroolefins, and hydrochlorofluoroolefins may all be employed as the halogenated olefin comonomer in the present invention. Suitable types of fluorinated olefins include fluoroethylenes, chlorofluoroethylenes, fluoropropenes, chlorofluoropropenes, fluorobutenes, chlorofluorobutenes, fluoropentenes, chlorofluoropentenes, fluorohexenes, chlorofluorohexenes and the like. In various embodiments of the invention, the halogenated olefin comprises two, three, four, five, six or more carbon atoms, e.g., 2-20 carbon atoms, 2-8 carbon atoms, 2-6 carbon atoms or 2-4 carbon atoms.

According to certain aspects of the invention, the halogenated olefin may have a structure in accordance with formula (1):

$$CX^1X^2=CX^3X^4 \quad (1)$$

wherein $X^1$, $X^2$, $X^3$ and $X^4$ are independently selected from the group consisting of hydrogen (H), chlorine (Cl), fluorine (F), bromine (Br), iodine (I) and halogenated and non-halogenated C1-C20 alkyl groups, subject to the proviso that the halogenated olefin comprises at least one halogen atom.

Specific representative examples of halogenated olefins suitable for use in the present invention include, but are not limited to:
CFCl=CH$_2$ (sometimes referred to as VCF)
CH$_2$=CF$_2$ (sometimes referred to as VDF or VF2)
CFH=CH$_2$
CF$_2$=CHF
CF$_3$CF=CH$_2$
CF$_2$=CF$_2$ (sometimes referred to as TFE)
CF$_2$=CHCl
CF$_3$CCl=CH$_2$
CF$_3$CH=CHCl
CF$_3$CF=CFH
CF$_3$CH=CF$_2$
CF$_3$CF=CF$_2$
CF$_3$CH$_2$CF=CH$_2$
CF$_3$CH=CFCH$_3$
CF$_3$CF=CHCF$_3$
CF$_3$CCl=CHCF$_3$
CF$_2$HCH$_2$CF=CH$_2$
CF$_2$HCH$_2$CF=CHCl
CF$_2$HCH=CFCH$_2$Cl
CH$_2$=CHCl
CHCl=CHCl
CH$_2$=CCl$_2$
CF$_2$=CFCl
CF$_3$CCl=CH$_2$
CF$_3$CCl=CClH
CF$_3$CH=CCl$_2$
CF$_3$CF=CCl$_2$
CF$_3$CF=CFCl
CF$_3$CF=CClH
CF$_3$CCl=CFH
CF$_3$CCl=CF$_2$
CF$_3$CCl=CFCl All possible isomers (e.g., E or Z isomers) of the above-mentioned halogenated olefins can be used.

In various embodiments of the invention, the halogenated olefin used to prepare the copolymer may have a purity (as calculated in weight percent) of at least 80, at least 85, at least 90, at least 95, at least 99, at least 99.9 or even 100%. Methods of preparing and purifying such halogenated olefins are well known in the art. In addition, suitable halogenated olefins are available from commercial sources, such as The Arkema Group.

The copolymer of the present invention also contains, in polymerized form, at least one co-monomer selected from the group consisting of halogenated alkenyl ethers, halogenated alkenyl esters and halogenated (meth)acrylates. In one preferred embodiment, at least one of the co-monomers also contains hydroxy functionality, or some other functional group such as amine, thiol, carboxylic acid, etc., which affords the possibility of subsequent crosslinking reactions, for instance through the use of a complementary external crosslinker. Examples of such complementary crosslinking chemistries are described, for example, in U.S. Pat. No. 6,680,357. These functional groups could also be reacted post-polymerization so as to modify one or more properties of the copolymer. The presence of such functional groups in the copolymer may also enhance its adhesion to the surfaces of at least some types of substrates, which may be of particular interest where the copolymer is to be employed as part of a coating composition.

Halogenated alkenyl ethers suitable for use in the present invention may be described as unsaturated organic compounds comprised of at least one halogen (F, Cl, Br and/or I) and a alkenyl ether moiety (a carbon-carbon double bond having an ether group substituted on a carbon involved in the carbon-carbon double bond, which may be generally represented as C=C—OR wherein OR is an alkoxy group, an aroxy group or the like, with OR optionally being further functionalized such as with a hydroxyl or ester group). The halogen(s) may be substituted on any of the carbon atoms of the halogenated alkenyl ether. In one embodiment, at least one of the carbon atoms of the carbon-carbon double bond is substituted by at least one halogen. In another embodiment, at least one of the carbon atoms of the carbon-carbon double bond is substituted by at least one halogenated alkyl group (e.g., a fluorinated alkyl group), which may be a perhalogenated alkyl group (e.g., a perfluorinated alkyl group). In still another embodiment, one or more halogens may be substituted on one or more carbon atoms of the —OR group. According to a further embodiment, at least one of the carbon atoms of the carbon-carbon double bond is substituted by at least one halogen and at least one of the carbon atoms of the carbon-carbon double bond is substituted by at least one halogenated alkyl group (e.g., a fluorinated alkyl group), which may be a perhalogenated alkyl group (e.g., a perfluorinated alkyl group).

Suitable halogenated alkenyl ethers include compounds corresponding to structural formula (2):

$$CX^5X^6=CX^7-OR^1 \qquad (2)$$

wherein the halogenated alkenyl ether comprises at least one halogen atom (in particular, at least one of $X^5$, $X^6$ or $X^7$ is halogen or a halogenated alkyl group), $X^5$, $X^6$ and $X^7$ are independently selected from a hydrogen atom, a chlorine atom, a fluorine atom, or a halogenated or non-halogenated alkyl group (e.g., an alkyl group having 1 to 8 carbon atoms), and $R^1$ is a halogenated or non-halogenated alkyl group optionally substituted by at least one hydroxyl group.

In certain embodiments of the invention, the halogenated alkenyl ether has a molecular weight of less than 900 g/mol, less than 800 g/mol or less than 700 g/mol.

Exemplary halogenated alkenyl ethers suitable for use in the present invention include, but are not limited to, the following compounds:

$CF_3-C(OR^1)=CH_2$,
$CF_3C(OR^1)=CFH$,
$CF_3C(OR^1)=CF_2$,
$CF_3-CH=CH(OR^1)$,
$CF_3CF=CF(OR^1)$,
$CF_3CF=CH(OR^1)$,
$CF_3CH=CF(OR^1)$,
$CF(OR^1)=CHCl$,
$CF(OR^1)=CH_2$,
$CF(OR^1)=CFCl$,
$CF(OR^1)=CFH$,
$CF(OR^1)=CCl_2$,
$CF_2=CF(OR^1)$,
$CF_3C(OR^1)=CFCF_3$,
$CF_3CH=C(OR^1)CH_3$,
$CF_3CH_2C(OR^1)=CH_2$,
$CF_3C(OR^1)=CHCF_3$,
$CF(OR^1)=CFCF_2CF_2H$,
$CF_3CF_2C(OR^1)=CH_2$,
$CF_3CF_2CF(CF_3)C(OR^1)=CH$;
$CH_3CH_2CH=CF(OR^1)$;
$CF_3C(OR^1)=CFCF_2CF_3$,
$CF_3CF=C(OR^1)CF_2CF_3$;
$(CF_3)_2CFC(OR^1)=CH_2$,
$CF_3CF_2CF_2CF_2C(OR^1)=CH_2$,
$CF_3CF_2CF_2C(OR^1)=CFCF_3$,
$CF_3CF_2CF_2CF=C(OR^1)CF_3$,
$F(CF_2)_5CF=CF(OR^1)$,
$C_4F_9C(OR^1)=CFCF_3$,
$C_4F_9CF=C(OR^1)CF_3$,
$F(CF_2)_6CF=CF(OR^1)$,
$F(CF_2)_5C(OR^1)=CFCF_3$, and
$F(CF_2)_5CF=C(OR^1)CF_3$, wherein $R^1$ is a halogenated or non-halogenated alkyl group having 1 to 8 carbon atoms.

For example, $R^1$ may be a linear, branched or cyclic alkyl group such as methyl, ethyl, n-propyl, isopropyl, n-butyl, iso-butyl, sec-butyl, n-pentyl, 2-ethylhexyl, n-octyl, cyclohexyl, methylcyclohexyl and the like as well as halogenated analogues thereof, including perhalogenated analogues (e.g., perfluorinated analogues) thereof.

According to further aspects of the invention, one of the monomers used to prepare the copolymer may be a halogenated alkenyl ether containing at least one hydroxy group (herein referred to as a "halogenated hydroxyl alkenyl ether"). For example, a halogenated hydroxy alkenyl ether represented by formula (4) may be employed:

$$CX^8X^9=CX^{10}-O-R^2-OH \qquad (4)$$

wherein $X^8$, $X^9$ and $X^{10}$ are independently selected from a hydrogen atom, a chlorine atom, a fluorine atom, a bromine atom, an iodine atom or a halogenated or non-halogenated alkyl group having 1 to 8 carbon atoms, provided that at least one of $X^8$, $X^9$ or $X^{10}$ is a halogen atom or a halogenated alkyl group, and $R^2$ is a halogenated or non-halogenated alkyl group having 2 to 13 carbon atoms, which may optionally contain one or more functional groups selected from carbonyl or ether functional groups and which may be substituted or unsubstituted.

For example, the moiety —$R^2$—OH in formula (4) may be selected from the group consisting of hydroxyethyl, hydroxypropyl, hydroxybutyl, hydroxypentyl, hydroxyhexyl, hydroxyoctyl, hydroxydecyl, hydroxylauryl, hydroxycyclobutyl, hydroxycyclopentyl, hydroxycyclohexyl, a polyethylene glycol residue, a polypropylene glycol residue, a polyethylene/polypropylene glycol residue, a glycerol residue, an alkoxylated glycerol residue, a sugar residue, an alkoxylated sugar residue, a trimethylolpropane residue, an alkoxylated trimethylolpropane residue, a pentaerythritol residue, an alkoxylated pentaerythritol residue, a dipentaerythritol residue, an alkoxylated dipentaerythritol residue, an alpha-glucoside residue, an alkoxylated alpha-glucoside residue, a trimethylolethane residue, an alkoxylated trimethylolethane residue, a sugar alcohol residue, an alkoxylated sugar alcohol residue, an alkanol amine residue, and an alkoxylated amine residue.

The synthesis of halogenated alkenyl ethers suitable for use as co-monomers in the present invention is described in a provisional United States application filed simultaneously with the present application under, the entire disclosure of which is incorporated herein by reference in its entirety for all purposes. Methods for preparing certain types of halogenated alkenyl ethers are also described in Hong et al., "A novel and convenient synthesis of (Z)-3,3,3-trifluoropropenyl alkyl ethers and $CF_3$-substituted propyl acetals as versatile $CF_3$-containing building blocks," *Chem. Commun.*, 1996, pages 57-58 and in Komata et al., "Convenient synthesis of 3,3,3-trifluoropropanoic acid by hydrolytic oxidation of 3,3,3-trifluoropropanal dimethyl acetal," *Journal of Fluorine Chemistry* 129 (2008, pages 35-39. Additionally, the preparation of fluorinated di alkenyl ethers is disclosed in US Patent Application Publication No. 2006/0122301 A1; such synthetic methods may be adapted to provide halogenated alkenyl ethers suitable for use in the present invention. The disclosures of the aforementioned publications are incorporated herein by reference in their entirety for all purposes.

For example, a halogenated alkenyl ether may be prepared by a method comprising reacting an alcohol with a halogenated olefin containing a carbon-carbon double bond, wherein at least one carbon of the carbon-carbon double bond is substituted with at least one halogen or at least one haloalkyl group, to produce the halogenated alkenyl ether. The halogenated olefin may, for example, contain one, two, three, four or more fluorine atoms. A fluorinated alkyl group, such as a perfluorinated alkyl group, may be substituted on one carbon of the carbon-carbon double bond.

According to certain embodiments, the halogenated olefin used in such reaction may have a structure in accordance with formula (1):

$$CX^1X^2=CX^3X^4 \qquad (1)$$

wherein $X^1$, $X^2$, $X^3$ and $X^4$ are independently selected from the group consisting of hydrogen (H), chlorine (Cl), fluorine (F), bromine (Br), iodine (I) and halogenated and non-halogenated C1-C20 alkyl groups, subject to the proviso that at least one of $X^1$, $X^2$, $X^3$ or $X^4$ is a halogen selected from the group consisting of chlorine (Cl), fluorine (F), bromine (Br) and iodine (I) or a haloalkyl group. In other aspects, at least one of $X^1$, $X^2$, $X^3$ or $X^4$ is Cl and the halogenated olefin additionally contains one, two, three, four or more fluorine atoms.

In certain embodiments, the halogenated olefin is selected from the group consisting of $CClF=CH_2$, $CH_2=CF_2$, $CFH=CH_2$, $CF_2=CHF$, $CF_3CF=CH_2$, $CF_2=CF_2$, $CH_2=CHCl$, $CHCl=CHCl$, $CH_2=CCl_2$, $CF_2=CFCl$; $CF_2=CHCl$, $CF_3CCl=CH_2$, $CF_3CCl=CClH$, $CF_3CH=CCl_2$, $CF_3CF=CCl_2$, $CF_3CF=CClH$, $CF_3CCl=CFH$, $CF_3CCl=CF_2$, $CF_3CCl=CFCl$, $CF_3CF=CFCl$, $CF_3CH=CHCl$, $CF_3CF=CFH$, $CF_3CH=CF_2$, $CF_3CF=CF_2$, $CF_3CH_2CF=CH_2$, $CF_3CH=CFCH_3$, $CF_3CF=CHCF_3$, $CF_3CCl=CHCF_3$, $CF_2HCH_2CF=CH_2$, $CF_2HCF=CHCl$ and $CF_2HCH=CFCH_2Cl$.

The alcohol reacted with the halogenated olefin may be an aliphatic alcohol, such as an an aliphatic monoalcohol or an aliphatic polyalcohol. The reaction may be carried out under basic conditions, such as in the presence of an inorganic base (e.g., an alkali metal hydroxide or an alkali metal salt of carbonic acid). The reaction may be carried out in a liquid medium, such as a liquid medium comprised of one or more organic solvents (e.g., polar, non-protic organic solvents). A phase transfer catalyst may be present. The alcohol and the halogenated olefin may be reacted at a temperature of from about 25° C. to about 200° C. or from about 50° C. to about 120° C. for a time of from about 0.5 hours to about 24 hours. The alcohol and the halogenated olefin may, for example, be reacted in a stoichiometric ratio of (moles alcohol)/x:moles halogenated olefin, wherein x=number of hydroxyl groups per molecule of the alcohol, of from about 1:8 to about 8:1.

For example, a trifluoropropenylether may be prepared by reacting the appropriate alcohol with a base in the presence of 1-chloro-3,3,3-trifluoro-prop-1-ene, hereafter referred to as 1233zd. The alcohol may be an aliphatic alcohol (e.g., an aliphatic monoalcohol or an aliphatic polyalcohol) or an aromatic alcohol (e.g., a phenolic compound).

In another aspect of this invention, 2-chloro-3,3,3-trifluoroprop-1-ene is used as the source of a trifluoropropene moiety in a halogenated alkenyl ether.

The above-described methods employ a halogenated olefin (for example, a fluorinated olefin) as a reactant. As used herein, the term "halogenated olefin" refers to an organic compound containing at least one carbon-carbon double bond and at least one halogen atom (Cl, F, Br, I). As used herein, the term "fluorinated olefin" refers to an organic compound containing at least one carbon-carbon double bond and at least one fluorine atom (and optionally one or more halogen atoms other than fluorine).

The halogenated olefin may contain one, two, three or more halogen atoms, such as bromine, chlorine, fluorine or iodine atoms or combinations thereof (e.g., at least one fluorine atom and at least one chlorine atom). In certain embodiments, the halogenated olefin contains at least one halogen atom substituted on at least one of the carbon atoms involved in a carbon-carbon double bond present in the halogenated olefin. Suitable fluorinated olefins include olefins containing one, two, three or more fluorine (F) atoms. The fluorine atom(s) may be substituted on one or both of the carbon atoms involved in a carbon-carbon double bond and/or may be present as a substituent on a moiety, such as an alkyl group, that is attached to one or both of the carbon atoms involved in a carbon-carbon double bond. For example, the fluorinated olefin may comprise one or more fluoroalkyl (e.g., perfluoroalkyl) groups, such as fluoromethyl, difluoromethyl, trifluoromethyl, fluoroethyl, difluoroethyl, trifluoroethyl, tetrafluoroethyl, perfluoroethyl, fluoropropyl, difluoropropyl, trifluoropropyl, tetrafluoropropyl, pentafluoropropyl, hexafluoropropyl, perfluoropropyl and the like and analogues thereof wherein wherein a portion of the fluorine atoms and/or one or more of the hydrogen atoms are replaced with other halogen atoms (e.g., Cl). The fluorinated olefin may comprise one or more halogen atoms other than fluorine, in particular one or more chlorine (Cl), iodine (I) and/or bromine (Br) atoms. In certain embodiments of the invention, the halogenated olefin or fluorinated olefin may comprise at least one chlorine atom substituted on a carbon atom involved in a carbon-carbon double bond. In further embodiments of the invention, the halogenated olefin or fluorinated olefin may comprise at least one hydrogen atom substituted on a carbon atom involved in a carbon-carbon double bond. For example, fluoroolefins, hydrofluoroolefins, chloroolefins, hydrochloroolefins, chlorofluoroolefins, and hydrochlorofluoroolefins may all be employed as the halogenated olefin reactant in the present invention. Suitable types of fluorinated olefins include fluoroethylenes, chlorofluoroethylenes, fluoropropenes, chlorofluoropropenes, fluorobutenes, chlorofluorobutenes, fluoropentenes, chlorofluoropentenes, fluorohexenes, chlorofluorohexenes and the like. In various embodiments of the invention, the halogenated olefin comprises two, three, four, five, six or more carbon atoms, e.g., 2-20 carbon atoms, 2-8 carbon atoms, 2-6 carbon atoms or 2-4 carbon atoms.

According to certain aspects, the halogenated olefin may have a structure in accordance with formula (1):

$$CX^1X^2=CX^3X^4 \qquad (1)$$

wherein $X^1$, $X^2$, $X^3$ and $X^4$ are independently selected from the group consisting of hydrogen (H), chlorine (Cl), fluorine (F), bromine (Br), iodine (I) and halogenated and non-halogenated C1-C20 alkyl groups, subject to the proviso that at least one of $X^1$, $X^2$, $X^3$ and $X^4$ is a halogen (F, Cl, Br, I) or a halogenated alkyl group (e.g., a fluorinated alkyl group such as trifluoromethyl).

Specific representative examples of halogenated olefins suitable for preparing a halogenated alkenyl ether include, but are not limited to:

$CClF=CH_2$
$CH_2=CF_2$
$CFH=CH_2$
$CF_2=CHF$
$CF_3CF=CH_2$
$CF_2=CHCl$
$CF_3CCl=CH_2$
$CF_3CH=CHCl$
$CF_3CF=CFH$
$CF_3CH=CF_2$
$CF_3CF=CF_2$
$CF_3CH_2CF=CH_2$
$CF_3CH=CFCH_3$
$CF_3CF=CHCF_3$
$CF_3CCl=CHCF_3$

CF₂HCH₂CF=CH—
CF₂HCH₂CF=CHCl
CF₂HCH=CFCH₂Cl
CH₂=CHCl
CHCl=CHCl
CH₂=CCl₂
CF₂=CFCl;
CF₃CCl=CH₂
CF₃CCl=CClH
CF₃CH=CCl₂
CF₃CF=CCl₂
CF₃CF=CFCl
CF₃CF=CClH
CF₃CCl=CFH
CF₃CCl=CF₂
CF₃CCl=CFCl

All possible isomers (e.g., E or Z isomers) of the above-mentioned halogenated olefins can be used.

In one embodiment, a chloro-substituted trifluoropropenyl compound is employed as the halogenated olefin reactant. Suitable chloro-substituted trifluoropropenyl compounds include 1-chloro-3,3,3-trifluoro-prop-1-ene (also known as 1233zd) and 2-chloro-3,3,3-trifluoroprop-1-ene. Either the cis or trans isomer of 1-chloro-3,3,3-trifluoro-prop-1-ene may be used (i.e., trans-(E)-1233zd or cis-(Z)-1233zd).

The alcohol utilized to prepare the halogenated alkenyl ether may contain one, two, three, four or more hydroxyl (—OH) groups. It is understood that under certain reaction conditions (for example, when the reaction is catalyzed or promoted by a base), the alcohol may be present in deprotonated or partially deprotonated form (e.g., one or more hydroxyl groups may be present as —O⁻). The alcohol may be monomeric, oligomeric or polymeric. There is no particular known restriction with respect to the number of carbon atoms which may be present in the alcohol, but in various embodiments of the invention the alcohol reacted with the halogenated olefin may be comprised of from 1 to 40 or from 2 to 20 carbon atoms.

The term "alcohol" refers to any organic compound bearing at least one hydroxyl group (—OH) substituted on an organic moiety. The organic moiety portion of the alcohol is not limited and may be, for example, an optionally substituted alkyl group, an optionally substituted heteroalkyl group, an optionally substituted alkylene group, an optionally substituted heteroalkylene group, an optionally substituted aryl group, an optionally substituted heteroaryl group, an optionally substituted cycloalkyl group, or an optionally substituted heterocycloalkyl group.

As used herein, the term "alkyl" is defined to include saturated aliphatic hydrocarbons including straight (linear) chains and branched chains. In some embodiments, the alkyl group has 1 to 20 carbon atoms, 1 to 10 carbon atoms, 1 to 6 carbon atoms, or 1 to 4 carbon atoms. An alkyl group optionally can be substituted by one or more (e.g. 1 to 5) suitable substituents. Heteroatoms such as oxygen, sulfur, phosphorus and nitrogen (in the form of tertiary amine moieties) may be present in the alkyl group, to provide a heteroalkyl group (e.g., an alkyl group containing one or more ether, thioether, or amino linkages). Illustrative examples of heteroalkyl groups include —CH₂CH₂N(CH₃)₂ and —CH₂CH₂OCH₂CH₃.

As used herein, the term "alkenyl" refers to aliphatic hydrocarbons having at least one carbon-carbon double bond, including straight chains and branched chains having at least one carbon-carbon double bond. In some embodiments, the alkenyl group has 2 to 20 carbon atoms, 2 to 10 carbon atoms, 2 to 6 carbon atoms, 3 to 6 carbon atoms, or 2 to 4 carbon atoms. An alkenyl group optionally can be substituted by one or more (e.g. 1 to 5) suitable substituents. The alkenyl group may exist as the pure E form, the pure Z form, or any mixture thereof. Heteroatoms such as oxygen, sulfur and nitrogen (in the form of tertiary amine moieties) may be present in the alkylene group, to provide a heteroalkylene group (e.g., an alkylene group containing one or more ether, thioether, or amino linkages).

As used herein, the term "cycloalkyl" refers to saturated or unsaturated, non-aromatic, monocyclic or polycyclic (such as bicyclic) hydrocarbon rings (e.g., monocyclics such as cyclopropyl, cyclobutyl, cyclopentyl, cyclohexyl, cycloheptyl, cyclooctyl, cyclononyl, or bicyclics including spiro, fused, or bridged systems. The cycloalkyl group may have 3 to 15 carbon atoms. In some embodiments the cycloalkyl may optionally contain one, two or more non-cumulative non-aromatic double or triple bonds and/or one to three oxo groups. Also included in the definition of cycloalkyl are moieties that have one or more aromatic rings (including aryl and heteroaryl) fused to the cycloalkyl ring. The cycloalkyl group optionally can be substituted by 1 or more (e.g., 1 to 5) suitable substituents.

As used herein, the term "aryl" refers to all-carbon monocyclic or fused-ring polycyclic aromatic groups having a conjugated pi-electron system. The aryl group may, for example, have 6, 10 or 14 carbon atoms in the ring(s). Phenyl, naphthyl and anthryl are example of suitable aryl groups As used herein, the term "heteroaryl" refers to monocyclic or fused-ring polycyclic aromatic heterocyclic groups with one or more heteroatom ring members (ring-forming atoms) each independently selected from O, S and N in at least one ring. The heteroaryl group may have 5 to 14 ring-forming atoms, including 1 to 13 carbon atoms, and 1 to 8 heteroatoms selected from O, S, and N. A heteroaryl group optionally can be substituted by 1 or more (e.g., 1 to 5) suitable substituents.

As used herein, the term "heterocycloalkyl" refers to a monocyclic or polycyclic [including 2 or more rings that are fused together, including spiro, fused, or bridged systems, for example, a bicyclic ring system], saturated or unsaturated, non-aromatic 4- to 15-membered ring system, including 1 to 14 ring-forming carbon atoms and 1 to 10 ring-forming heteroatoms each independently selected from O, S and N. The heterocycloalkyl group optionally can be substituted by 1 or more (e.g., 1 to 5) suitable substituents.

Suitable types of groups which may be present as substituents in any of the above-mentioned organic moieties include one or more of the following: halo (F, Cl, Br, I), alkyl, aryl, alkoxy, cyano (—CN), carboxyl (—C(=O)R, where R is an organo substituent such as alkyl, aryl or the like), carboxylic acid (—C(=O)OH, cycloalkoxy, aryloxy, tertiary amino, sulfate (—SO₃M, wherein M is alkali metal or ammonium), oxo, nitrile and the like.

As used herein, the term "halo" or "halogen" group is defined to include fluorine, chlorine, bromine or iodine.

As used herein, the term "alkoxy" refers to an —O-alkyl group. The alkoxy group optionally can be substituted by 1 or more (e.g., 1 to 5) suitable substituents.

As used herein, the term "cycloalkoxy" or "cycloalkyloxy" refers to an —O-cycloalkyl group. The cycloalkoxy or cycloalkyloxy group optionally can be substituted by 1 or more (e.g., 1 to 5) suitable substituents.

As used here, the term "aryloxy" refers to an —O-aryl group. An example of an aryloxy group is —O-phenyl (i.e., phenoxy). The aryloxy group optionally can be substituted by 1 or more (e.g., 1 to 5) suitable substituents.

As used herein, the term "oxo" refers to =O. When an oxo is substituted on a carbon atom, they together form a carbonyl moiety [—C(=O)—]. When an oxo is substituted on a sulfur atom, they together form a sulfinyl moiety [—S(=O)—]; when two oxo groups are substituted on a sulfur atom, they together form a sulfonyl moiety [—S(=O)$_2$—].

As used herein, the term "optionally substituted" means that substitution is optional and therefore includes both unsubstituted and substituted atoms and moieties. A "substituted" atom or moiety indicates that any hydrogen on the designated atom or moiety can be replaced with a selection from the indicated substituent group (up to that every hydrogen atom on the designated atom or moiety is replaced with a selection from the indicated substituent group), provided that the normal valency of the designated atom or moiety is not exceeded, and that the substitution results in a stable compound. For example, if a phenyl group (i.e., —C$_6$H$_5$) is optionally substituted, then up to five hydrogen atoms on the phenyl ring can be replaced with substituent groups.

In certain embodiments of the invention, the alcohol reacted with halogenated olefin to provide a halogenated alkenyl ether corresponds to the general structure Q(OH)$_x$, wherein Q is a substituted or unsubstituted organic moiety (e.g., alkyl, heteroalkyl, cycloalkyl, heterocycloalkyl, aryl, heteroaryl and substituted variants thereof) and x is an integer of 1 or more (e.g., 1-10, 1-5 or 1-3). In such compounds, the oxygen atom of each hydroxyl group is bonded to a carbon atom of Q.

In certain embodiments of the invention, the alcohol reacted with the halogenated olefin may be an aliphatic polyalcohol, that is, an aliphatic alcohol containing two or more hydroxyl groups per molecule (e.g., two to six hydroxyl groups per molecule), which are sometimes referred to as "polyols". By controlling the reaction conditions (e.g., the stoichiometry of the aliphatic polyalcohol and the halogenated olefin), all of the hydroxyl groups may be reacted or only a portion of the hydroxyl groups may be reacted. The partially reacted products may be of interest when it is desired to obtain a halogenated alkenyl ether product that contains at least one halogenated (e.g., fluorinated) alkenyl group, but also at least one hydroxyl group that is still available for further reaction (such as with a hydroxyl-reactive compound other than a halogenated olefin, such as an isocyanate or a carboxylic acid or anhydride) or that can participate in hydrogen bonding or the like (thereby varying the properties of the product). Examples of suitable aliphatic polyalcohols include, but are not limited to, C$_1$-C$_8$ aliphatic diols (including glycols), sugar alcohols, glycerol, trihydroxybutanes, trihydroxypentanes, trihydroxyhexanes, pentaerythritol, trimethylolpropane, trimethylolpropane, dipentaerythritol and alkoxylated derivatives thereof (e.g., where any of the aforementioned aliphatic polyalcohols has been reacted with from 1 to 30 moles or more of an alkylene oxide such as ethylene oxide and/or propylene oxide per mole of aliphatic polyalcohol).

Following reaction with a halogenated olefin, at least one of the active hydrogens of the alcohol (i.e., the hydrogens in one or more of the hydroxyl groups) is replaced by a halogenated alkenyl (vinyl) group (e.g., —CF=CH$_2$, —CH=CHCF$_3$ or —C(CF$_3$)=CH$_2$). In other embodiments (where the alcohol is a polyalcohol), less than all of the active hydrogens of the polyalcohol are replaced by a halogenated alkenyl group. In such embodiments, the halogenated alkenyl ether obtained may be represented by the general structure Q(YH)$_{n-m}$(Y-Alk)$_m$ wherein Q, Y and n have the same meaning as stated above, m is an integer of from 1 to n−1, and Alk is a halogenated alkenyl group.

Without wishing to be bound by theory, it is believed that the above-described reaction proceeds by addition of a hydroxyl group of the alcohol across the double bond of the halogenated olefin. Such reaction forms a halogenated alkyl group (i.e., the halogenated olefin is converted to a halogenated alkyl group which is present within the product formed). Typically, the oxygen atom of the reacted hydroxyl group of the alcohol becomes preferentially bonded to the more "halogen heavy" carbon atom of the carbons involved in the carbon-carbon double bond of the halogenated olefin (i.e., the carbon having the greatest number of halogen atoms bonded to it). In certain cases, mixtures of different products are obtained, wherein the oxygen atom of the reacted hydroxyl group becomes bonded to each of the carbon atoms involved in the carbon-carbon double bond. An alkenyl group results from elimination of hydrohalide from the halogenated alkyl group. Such elimination may be favored by increasing the basicity of the reaction medium.

The aforementioned transformations may be generically illustrated as follows.

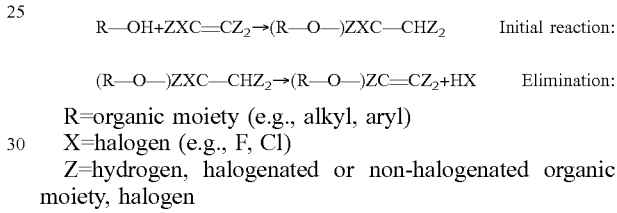

R=organic moiety (e.g., alkyl, aryl)
X=halogen (e.g., F, Cl)
Z=hydrogen, halogenated or non-halogenated organic moiety, halogen The alcohol and the halogenated olefin are contacted with each other for a time and at a temperature effective to achieve the desired extent of reaction between the starting materials, whereby the desired halogenated alkenyl ether is produced.

The reaction may be carried out using any suitable manner and any suitable equipment, apparatus or system, which may vary depending upon the reactants and the reaction conditions selected. For example, the reaction may be performed in a batch, continuous, semi-continuous or staged or step-wise mode. Where one or more of the reactants is relatively volatile (e.g., where the reactant has a boiling point less than or only somewhat above the desired reaction temperature), it may be advantageous to conduct the reaction in a closed or pressurized vessel and/or to provide a means to collect any of the volatile reactant that may distill out of the reaction mixture (using, for example, a reflux condenser) and return such reactant to the reaction mixture. The reaction vessel may be provided with suitable heating, cooling and/or stirring/agitation means, as well as lines for introducing and/or withdrawing materials.

In one embodiment of the invention, the reaction is carried out under elevated pressure, i.e., pressures greater than atmospheric pressure. For example, pressures of from ambient to 50 bar may be utilized.

The alcohol and the halogenated olefin may be reacted neat. An excess of one of the reactants may be utilized, in effect, as a solvent. In another embodiments, a reaction medium such as a solvent or combination of solvents may be employed to solubilize or otherwise disperse the reactants and/or the reaction product(s). According to certain aspects of the invention, one or more organic solvents are employed in admixture with the reactants. In particular, polar, non-protic organic solvents may be utilized, such as sulfoxides (e.g., DMSO), amides (e.g., dimethyl formamide (DMF), dimethylacetamide, diethylacetamide, hexamethylphosphoramide (HMPA), hexametylphosphorous triamide (HMPT)), nitriles (e.g., acetonitrile, benzonitrile), sulfolane, esters (e.g., ethyl acetate), ethers (THF), N-methyl-2-pyrrolidinone (NMP), nitrobenzene, nitromethane, ketones (e.g., acetone, methylethylketone), carbonates such as 4-fluoro-1,3-dioxolan-2-one (FEC), cis-4,5-difluoro-1,3-dioxolan-2-one (cis-DFEC), trans-4,5-difluoro-1,3-dioxolan-2-one (trans-DFEC), 4,4-difluoro-1,3-dioxolan-2-one (gem-DFEC), 4-fluoromethyl-1,3-dioxolan-2-one (FPC), 4-trifluoromethyl-1,3-dioxolan-2-one (TFPC), ethylene carbonate (EC), propylene carbonate (PC), trans-butylene carbonate (t-BC), dimethyl carbonate (DMC) and the like and combinations thereof. Polar, protic solvents such as alcohols and aminoalcohols (e.g., 2-aminoethanol) may also be used under at least certain reaction conditions, for example, where the alcohol reactant is more reactive than the polar, protic solvent with the halogenated olefin. An organic solvent or a mixture of organic solvents having a dielectric constant between 2 and 190 under ambient conditions (25° C.), preferably between 4 and 120, and even more preferably between 13 and 92 may be employed in the present invention. Water may also be present, in combination with one or more organic solvents (which may be miscible with water or immiscible with water). Accordingly, the liquid reaction medium may comprise a mixture of water and one or more organic solvents.

To promote the desired reaction between the alcohol and the halogenated olefin, it may be advantageous to conduct the contacting of the reactants under basic conditions. For example, one or more bases may be present in the reaction mixture; the base may be present in solubilized or insoluble form. The base may be a weak or a strong base, provided that it is not so strong that it leads to undesired side reactions of the halogenated alkenyl ether which is the target product. Inorganic bases may be used, in particular alkali metal hydroxides (e.g., NaOH, KOH) and alkali metal salts of carbonic acid (e.g., potassium carbonate, sodium carbonate, cesium carbonate). Organic bases, in particular tertiary amines such as trialkylamines, pyridine and the like may also be employed. The use of basic ion exchange resins is also possible. The amount of base may be varied as may be desired depending upon the reactants and base used and other reaction conditions (temperature, solvent), but in one embodiment is approximately equimolar with respect to the moles of alcohol used. More highly basic conditions (i.e., the use of a strong base or high pH) typically helps promote the formation of an alkenyl-containing product, which is believed to result from the elimination of hydrohalide from an initially formed haloalkyl-containing product.

Optionally, a phase transfer catalyst (PTC) may also or additionally be employed to promote the desired reaction between the halogenated olefin and the alcohol. Any suitable phase transfer catalyst known in the field of organic chemistry may be employed such as, for example, ammonium compounds (e.g., quaternary ammonium compounds such as tetraalkylammonium halides or hydroxides), phosphonium compounds, crown ethers, cryptands (also referred to as cryptates), polyethylene glycols (PEG) and ethers thereof and other organo-based complexing agents. The phase transfer catalyst may be water soluble or organic soluble. Typically, if a phase transfer catalyst is used in combination with a base, the molar amount of phase transfer catalyst may be, for example, 0.1 to 5% of the molar amount of base.

Reaction temperatures may vary, for example, from about room temperature (25° C.) to about 200° C., e.g., from about 50° C. to about 150° C. or from about 60° C. to about 120° C. The pressure in the reactor is between ambient and 50 bar, preferably between ambient and 20 bar. The pressure may be the autogenous pressure of the solution, or an inert, for example nitrogen, may be added to increase the pressure. Typically, reaction times will range from about 0.5 hours to about 24 hours, e.g., from about 4 to about 12 hours.

The reactants may be combined all at once and then reacted. Alternatively, one or both of the alcohol and the halogenated olefin may be added continuously or in portions or stages to the reaction mixture. If the alcohol contains two or more active hydrogen-containing functional groups and it is desired to obtain a product in which at least one of the hydroxyl groups remains unreacted, it may be preferred to add the halogenated olefin incrementally to the alcohol while reacting the two reactants so as to favor the production of the desired product.

In certain embodiments of the invention, approximately stoichiometric amounts of the alcohol and the halogenated olefin are employed, but in other embodiments a stoichiometric excess of one reactant may be used.

For instance, the alcohol and the halogenated olefin may be reacted in a stoichiometric ratio of (moles alcohol)/x:moles halogenated olefin, wherein x is the number of hydroxyl groups per molecule of the alcohol, of from about 1:8 to about 8:1, about 1:7 to about 7:1, about 1:6 to about 6:1, about 1:5 to about 5:1, about 1:4 to about 4:1, about 1:3 to about 3:1, about 1:2 to about 2:1, or about 1:1.5 to about 1.5:1, or about 1:1.1 to about 1.1:1.

Where the alcohol contains two or more hydroxyl groups per molecule and it is desired to obtain a product, following reaction with a halogenated olefin, that contains one or more free (unreacted) hydroxyl groups per molecule (e.g., a halogenated hydroxy vinyl ether), it may be desirable to employ a stoichiometric excess of the alcohol relative to the halogenated olefin so as to favor the production of such a product over a product where all the hydroxyl groups have reacted with halogenated olefin. In such cases, the alcohol and the halogenated olefin may be reacted in a stoichiometric ratio of (moles alcohol)/x:moles halogenated olefin, wherein x=number of hydroxyl groups per molecule of the alcohol, of from about 1:1 to about 12:1, about 1.5:1 to about 10:1 or about 2:1 to about 8:1.

Once the reaction between the alcohol and the halogenated olefin has been carried out for a desired period of time (e.g., to a predetermined degree of conversion of the starting materials), the reaction mixture obtained may be subjected to one or more further processing and/or purification steps in order to isolate the desired halogenated alkenyl ether from the other components of the reaction mixture (e.g., solvent, unreacted starting materials, undesired byproducts, base, and so forth). Any of the purification techniques known in the organic chemistry field, or any combination of such techniques, may be employed, with the particular methods selected being influenced by various parameters such as the volatility, crystallizability, solubility, polarity, acidity/basicity and other such characteristics of the components of the reaction mixture. Suitable isolation/purification techniques include, but are not limited to, distillation (including fractional distillation), extraction, filtration, washing, neutralization, chromatographic separation, adsorption/absorption, treatment with ion exchange resin, crystallization, recrystallization, trituration, sublimation, precipitation, dialysis, membrane separation, filtration, centrifugation, decolorization, drying and the like and combinations thereof. By application of such techniques, the halogenated alkenyl ether may be obtained in a purity (by weight) of at least 80%, at least 85%, at least 90%, at least 95%, at least 99% or even 100%.

Halogenated alkenyl esters suitable for use in the present invention may be characterized as organic compounds containing both a alkenyl ester moiety (—C(O)—O—C=C) and at least one halogen atom (F, Cl, Br and/or I). According to one embodiment, the halogenated alkenyl ester corresponds to structure R—C(=O)—O—CH=CH$_2$ wherein R is an organic moiety containing at least one halogen atom. For example, R may be a C1-C18 haloalkyl group (such a halogenated alkenyl ester may be referred to as a alkenyl haloalkanoate). The haloalkyl group may be perhalogenated (e.g., perchlorinated or perfluorinated). Alternatively, the haloalkyl group may be only partially halogenated. The haloalkyl group may be straight chain (linear), branched or cyclic or some combination thereof (for example, a halogenated methyl-substituted cyclohexyl group). Non-cyclic R groups may have the formula $C_xH_yX_z$ wherein x is an integer of from 1 to 18, H is 0 or an integer of from 1 to 2x, X is halogen (F, Cl, Br, I, which may be the same as or different from each other if more than one halogen is present) and z is an integer of from 1 to 2x+1, where y+x equals 2x+1. Specific examples of suitable R groups include, but are not limited to, mono-, di- and trifluoromethyl, mono-, di- and trichloromethyl, perfluoroethyl, perchloroethyl, perfluoro-n-propyl, perchloro-n-propyl and the like. Illustrative, non-limiting examples of suitable halogenated alkenyl esters include alkenyl fluoroacetate, alkenyl difluoroacetate, alkenyl trifluoroacetate, alkenyl chloroacetate, alkenyl dichloroacetate, alkenyl trichloroacetate, alkenyl 2-chloropropionate, alkenyl n-pentafluoropropionate, and alkenyl n-heptafluorobutyrate.

Halogenated (meth)acrylates are also suitable for use as co-monomers in preparing the copolymers of the present invention. As used herein, the term halogenated (meth)acrylate refers to an organic compound comprising an acrylate (—O—C(=O)CH=CH$_2$) or methacrylate (—O—C(=O)C(CH$_3$)=CH$_2$) functional group and at least one halogen atom (F, Cl, Br, I). In one embodiment, the halogenated (meth)acrylate comprises a single (meth)acrylate functional group.

The halogenated (meth)acrylate may comprise two, three, four, five or more halogen atoms, which may be the same as or different from each other. In certain embodiments, the only halogen present in the halogenated (meth)acrylate is fluorine. In other embodiments, the halogenated (meth)acrylate is perhalogenated (e.g., perfluorinated) such that every carbon atom other than the carbon atoms present in the (meth)acrylate functional group is substituted by halogen (e.g., fluorine) only, with no hydrogen being substituted on such carbon atom(s). The halogenated (meth)acrylate may correspond to the general structure $R^1$—O—C(=O)CR=CH$_2$, wherein R is hydrogen or methyl and $R^1$ is an organic moiety comprising one or more halogen substituents, such as a halogenated alkyl group, a halogenated cycloalkyl group, a halogenated aryl group, or a halogenated aralkyl group. Such organic moieties may comprise one or more substituents other than halogen substituents, including for example alkoxy, cyano, nitro or carboxylate substituents. $R^1$ may be perhalogenated, in particular perfluorinated.

Suitable fluorine-containing acrylate and methacrylate co-monomers include, for example, 2-fluoroethyl acrylate and 2-fluoroethyl methacrylate; 1,1,1,3,3,3-hexafluoro-iso-propyl acrylate and 1,1,1,3,3,3-hexafluoro-iso-propyl methacrylate; 1,1-dihydroperfluoroalkyl acrylates and methacrylates of the general structure, $CF_3(CF_2)_nCH_2OC(=O)C(R)$=CH$_2$, in which R is hydrogen or methyl and n is typically 0 to 12, such as, 2,2,2-trifluoroethyl acrylate and 2,2,2-trifluoroethyl methacrylate, 2,2,3,3,3,-pentafluoropropyl acrylate and 2,2,3,3,3,-pentafluoropropyl methacrylate, 1H, 1H-heptafluorobutyl acrylate and 1H, 1H-heptafluorobutyl methacrylate, 1H, 1H,-perfluoropentyl acrylate and 1H,1,H-perfluoropentyl methacrylate, 1H, 1H,-perfluorohexyl acrylate and 1H,1,H-perfluorohexyl methacrylate, 1H, 1H,-perfluorooctyl acrylate and 1H,1,H-perfluorooctyl methacrylate, 1H, 1H,-perfluorodecyl acrylate and 1H,1,H-perfluorodecyl methacrylate, 1H, 1H,-perfluorododecyl acrylate and 1H,1,H-perfluorododecyl methacrylate; 1,1,2,2-tetrahydroperfluoroalkyl acrylates and methacrylates of the general structure $CF_3(CF_2)_n(CH_2)_2OCOC(R)$=CH$_2$, in which R is hydrogen or methyl and n' is typically 0 to 11, such as 3,3,4,4,4-pentafluorobutyl acrylate and 3,3,4,4,4-pentafluorbutyl methacrylate, 1H, 1H,2H,2H-perfluorohexyl acrylate, 1H, 1H,2H,2H-perfluorohexyl methacrylate, 1H, 1H,2H,2H-perfluorooctyl acrylate, 1H, 1H,2H,2H-perfluorooctyl methacrylate, 1H, 1H,2H,2H-perfluorodecyl acrylate and 1H, 1H,2H,2H-perfluorodecyl methacrylate, and 1H,1H,2H,2H-perfluorododecyl acrylate and 1H, 1H,2H, 2H-perfluorododecyl methacrylate; 1,1,Ω-trihydroperfluoroalkyl acrylates and methacrylates of the general structure $CHF_2(CF_2)_n(CH_2)_2OCOC(R)$=CH$_2$. in which in which R is hydrogen or methyl and n" is typically 0 to 12, such as 2,2,3,3-tetrafluoropropyl acrylate and 2,2,3,3-tetrafluoropropyl methacrylate,1H, 1H,5H-perfluoropentyl acrylate and 1H, 1H,5H-perfluoropentyl methacrylate, 1H, 1H,7H-perfluoroheptyl acrylate and 1H, 1H,7H-perfluoroheptyl methacrylate, 1H,1H,9H-perfluorononly acrylate and 1H,1H,9H-perfluorononyl methacrylate, 1H,1H,11H-perfluoroundecyl acrylate and 1H,1H, 11H-perfluoroundecyl methacrylate; 2,2,3,4,4,4-hexafluorobutyl acrylate and 2,2,3,4,4,4-hexafluorobutyl methacrylate, perfluorocyclohexyl methyl acrylate and perfluorocyclohexyl methyl methacrylate, 3-(trifluoromethyl) benzyl acrylate and 3-(trifluoromethyl) benzyl methacrylate, pentafluorophenyl acrylate and pentafluorophenyl methacrylate; pentafluorobenzyl acrylate and pentafluorobenzyl methacrylate; pentafluorobenzyl acrylate and pentafluorobenzyl methacrylate; and mixtures thereof.

The haloalkyl ether (meth)acrylates and haloalkenyl ether (meth)acrylates described in the provisional United States application being filed simultaneously herewith are also suitable for use as halogenated (meth)acrylate co-monomers in accordance with the present invention. The disclosure of the aforementioned provisional United States application is incorporated herein by reference in its entirety for all purposes.

The copolymer of the present invention may also contain other ethylenically unsaturated comonomers besides the halogenated olefin(s) and the above-mentioned halogenated co-monomers (halogenated alkenyl ethers, halogenated alkenyl esters, and/or halogenated (meth)acrylates). Examples of such other types of ethylenically unsaturated comonomers include non-halogenated olefins such as ethylene, propylene, and alpha olefins, non-halogenated alkenyl ethers such as hydroxybutyl alkenyl ether or ethyl alkenyl ether, non-halogenated alkenyl esters such as alkenyl acetate and alkenyl versatate, allyl ethers and esters, acid functional alkenylic comonomers such as acrylic acid, methacrylic acid, itaconic acid, and maleic acid, as well as their various esters, non-halogenated (meth)acrylates (e.g., non-halogenated C1-C12 alkyl (meth)acrylates), and aromatic alkenylic comonomers such as styrene. In certain embodiments, the copolymer does not contain any monomer other than halogenated olefin and halogenated co-monomer (i.e., the halogenated olefin(s) and halogenated co-monomer(s) together constitute 100% by weight of the copolymer). In other embodiments, however, the copolymer comprises up to 50%, up to 40%, up to 30%, up to 20%, up to 10%, up to 5% or up to 1% by weight of one or more monomers other than halogenated olefin and halogenated co-monomer. For example, the copolymer may be comprised of from 0.1 to 50% by weight of monomer(s) other than halogenated olefin and halogenated co-monomer.

The arrangement of the co-monomers (halogenated olefin and halogenated co-monomer) along the polymer backbone, in the copolymer of the present invention, depends on the kinetics of the polymerization and may take several forms. One preferred arrangement is that of an alternating copolymer, with a regular alternation of the halogenated olefin and the halogenated co-monomer. Alternating copolymers of fluorinated olefins and fluorinated co-monomers are especially preferred as these would be expected to have superior resistance to free radical, oxidative, or photooxidative attack, such as might be desirable for materials used in exterior coatings, battery component, photovoltaic devices, energy storage devices, membranes, and filtration devices. Also preferred are alternating copolymers employing a functional halogenated (or non-halogenated) co-monomer, which allows the possibility of crosslinking reactions to occur at a later time, for instance during the application process for a coating, or during the fabrication of a device. As is well known in the art, by building coating properties through crosslinking reactions, copolymers of lower molecular weight may be employed, affording applications advantages in terms of lower coating viscosity, coating gloss, etc. while still maintaining properties such as good chemical resistance and high toughness.

Another preferred arrangement of co-monomers along the copolymer backbone is that of a random copolymer (which may also be referred to as a statistical copolymer). The structures of random copolymers are typically determined by the reaction kinetics of the different monomers being reacted during the copolymerization. The random copolymer may, in one embodiment of the invention, have a linear structure, but in other embodiments may have a branched or even crosslinked structure.

Still another preferred arrangement of co-monomers along the copolymer backbone is that of a block copolymer. Such block copolymers may, for example, be comprised of at least one block of a halogenated olefin and at least one block of a halogenated co-monomer and may be either linear or branched (radial) in structure. In various embodiments, the block copolymer may, for example, have any of the following structures: A-B; A-B-A; B-A-B; A-B-A-B; or A-B-A-B-A, wherein A is a block of halogenated olefin in polymerized form (i.e., a poly(halogenated olefin) block) and B is a block of halogenated co-monomer (i.e., a poly (halogenated alkenyl ether block), a block of halogenated alkenyl ester (i.e., a poly(halogenated alkenyl ester block), or a block of halogenated (meth)acrylate (i.e., a poly(halogenated (meth)acrylate block)).

Gradient copolymers are also considered to be within the scope of the present invention.

The characteristics of the copolymer may be varied and controlled as may be desired for particular end-use applications, by selection of particular co-monomers and polymerization conditions among other factors. For example, the copolymers may be amorphous, semi-crystalline or crystalline; linear, branched or cross-linked; thermoplastic, thermoset or elastomeric.

In certain embodiments of the invention, the copolymer has a number average molecular weight of 5000 to 1,500,000, or 5000 to 500,000, or 5000 to 250,000, or 5000 to 100,000 daltons (g/mol) as measured by gel permeation chromatography using polystyrene standards. Depending upon the polymerization method used as well as other parameters, the polydispersity ($M_w/M_n$) of the copolymer may be for example from 1 to 3 or even higher.

In preferred embodiments, a copolymer in accordance with the present invention is formed by copolymerization of one or more halogenated olefins and one or more halogenated co-monomers selected from the group consisting of halogenated alkenyl ether monomers, halogenated alkenyl ester monomers, and halogenated (meth)acrylate monomers. The copolymer of the invention can, for example, be made in an organic media (solution polymerization) or in an aqueous media (dispersion and emulsion polymerization) which contains 0.1% to 80% by weight in total of monomers, more preferably from 0.5% to 50% by weight in total of monomers, and even more preferably 1% to 40% by weight in total of monomers.

The polymerization process can be a batch, semi-batch or continuous polymerization process. An emulsion process is preferred, though a suspension process or a solution process may also be used. Neat or bulk polymerization may also be practiced.

If the polymerization is carried out in an organic medium, one or more organic solvents can be employed as the organic medium, including solvents such as N-methyl-2-pyrrolidone (NMP), dimethylformamide (DMF), N,N-dimethylacetamide (DMAc), dimethylsulfoxide (DMSO), hexamethylphosphamide, tetramethylurea, triethyl phosphate (TEP), trimethyl phosphate (TMP), dimethyl succinate, diethyl succinate and tetraethyl urea, and the like. According to one preferred embodiment the medium acts as a solvent and/or dispersant for the monomer and/or polymer, and such operations include dispersion, emulsion and solution polymerization. Examples of medium in such systems, including preferably solvents for solution polymerization, include: esters, such as methyl acetate, ethyl acetate, propyl acetate and butyl acetate; ketones, such as acetone, methyl ethyl acetone and cyclohexanone; aliphatic hydrocarbons, such as hexane, cyclohexane, octane, nonane, decane, undecane, dodecane and mineral spirits; aromatic hydrocarbons, such as benzene, toluene, xylene, naphthalene, and solvent napthta; alcohols, such as methanol, ethanol, tert-butanol, iso-propanol, ethylene glycol monoalkyl ethers; cyclic ethers, such as tetrahydrofuran, tetrahydropyran, and dioxane; fluorinated solvents, such as HCFC-225, HFC 365mfc, HFO 1336mzz, HCFC-141b; trans or cis 1-chloro-3,3,3-trifluoropropene or mixture thereof, hydrofluoroether such as HFE 7100, and HFE 7200, dimethyl sulfoxide; and mixtures thereof.

When the polymerization is conducted in supercritical carbon dioxide, carbon dioxide can be used alone or mixed with solvent described above. For example, fluorinated solvents, such as HCFC-225, HFC 365mfc, HFO 1336mzz, HCFC-141b; trans or cis 1-chloro-3,3,3-trifluoropropene or mixture thereof, hydrofluoroether such as HFE 7100 and HFE 7200, When the polymerization is conducted in an aqueous media, such as in a dispersion or an emulsion polymerization, the following procedure may be followed: to a reactor is initially added deionized water and at least one dispersion agent, followed by deoxygenation (removal of oxygen). It is preferred that pH of the aqueous media is between 2 and 10, more preferably between 4 and 9, and even more preferably between 6 and 8. The reactor may be a pressurized polymerization reactor equipped with a stirrer and heat control means. The stirring may be constant, or may be varied to optimize process conditions during the course of the polymerization. After the reactor reaches the desired temperature, at least one monomer is added to the reactor to reach a predetermined pressure and then a free radical initiator is introduced to the reactor with a suitable flow rate to maintain proper polymerization rate. The ratio of halogenated olefin(s) and halogenated co-monomer(s) may be selected at the beginning of the reaction stage, the middle of the reaction stage and in the finished reaction stage. The purpose of such selection (where the goal is to prepare a random copolymer) is to control the distribution of the different monomers so as to minimize the blockiness of the copolymer formed, by favoring a statistically random distribution of monomers in the growing copolymer chain. After reaching the desired solid level, the feed of the monomers can be stopped. However, the charging of initiator can be stopped or continued to consume the unreacted monomers. After the initiator charging is stopped, the reactor may be cooled and agitation stopped. The unreacted monomers can be vented and the prepared copolymer can be collected through a drain port or by other collection means. The copolymer can be isolated using standard methods such as oven drying, spray drying, shear or acid coagulation followed by drying, or kept in the aqueous media for subsequent application or use.

In an emulsion polymerization, a suitable surfactant or emulsifier can be employed to obtain a stable dispersion, thereby forming a latex of the copolymer. A surfactant is a type of molecule which has both hydrophobic and hydrophilic portions, which allows it to stabilize and disperse hydrophobic molecules and aggregates of hydrophobic molecules in aqueous systems. In an emulsion polymerization in accordance with the present invention, a fluorinated surfactant may be used to form the copolymers, particularly copolymers having relatively high molecular weights. As used herein, the term "fluorinated surfactant" means that the main surfactant chain contains one or more fluorine atoms. Suitable types of fluorinated surfactants include, for example, the ammonium salt of perfluoro octanoic acid and salts of perfluoro alkyl sulfonic acids. Fluorinated surfactants tend to be expensive and may be subject to restrictions imposed by the United States Environmental Protection Agency (EPA). For these reasons, it may be preferred to instead use one or more non-fluorinated surfactants. A non-fluorinated surfactant is a surfactant in which there is no fluorine on the main chain of the surfactant, although the terminal group(s) of the surfactant can contain one or more fluorine atoms. Suitable non-fluorinated surfactants may, for example, be selected from the group consisting of:

i) non-ionic block copolymers with formula of $T_1$-[($CH_2$—$CH_2$—O—)$_X$]$_m$—[($CH_2$—$C(CH_3)$—O—)$_Y$]$_n$—[($CH_2$—$CH_2$—$CH_2$—$CH_2$—O—)$_Z$]$_k$-$T_2$ wherein X, Y, and Z are between 2 to 200; and m, n, k are from 0 to 5, $T_1$ and $T_2$ are terminal groups selected from hydrogen, hydroxyl, carboxyl, ester, ether or hydrocarbon, including but not limited to polyethylene glycol acrylate (PEGA), polyethylene glycol (PEG), and polyethylene glycol octyl-phenyl ether (Triton® X-100), polypropylene glycol acrylate (PPGA), polypropylene glycol (PPG), polyethylene glycol methacrylate (PEGMA), dimethyl polyethylene glycol (DMPEG), polyethylene glycol butyl ether (PEGBE), polypropylene glycol methacrylate (PPG-MA), polypropylene glycol di-methacrylate (PPG-DMA), and polytetramethylene glycol (PTMG);

ii) alkyl phosphonic acids, polyvinylphosphonic acid, polyacrylic acid, polyvinyl sulfonic acid, and the salts thereof;

iii) alkanesulfonate selected from C7-C20 linear 1-alkanesulfonates, C7-C20 linear 2-alkanesulfonates, C7-C20 linear 1,2-alkanedisulfonates, or mixtures thereof;

iv) alkyl sulfate surfactants such as R—$SO_4$M, and $MO_4$S—R—$SO_4$M, where R is a hydrocarbon group, and M is a monovalent cation selected from alkali metal cations or ammonium. Examples of alkyl sulfate surfactants include sodium laurel sulfate, potassium laurel sulfate, ammonium laurel sulfate, and mixtures thereof; and v) siloxane-based surfactants.

The polymerization may use, for example, from 100 ppm to 2 weight percent, preferably 300 ppm to 1 weight percent, based on the weight of the copolymer solids, of one type of fluorinated or non-fluorinated surfactant, or blends of fluorinated surfactants, or blends of non-fluorinated surfactants, or blends of one or more fluorinated surfactants and non-fluorinated surfactants. In the polymerization process, the surfactant or emulsifier could be added all upfront prior to polymerization, fed continuously during the polymerization, fed partly before and then during polymerization, or fed after polymerization started and progressed for a while.

In dispersion or suspension polymerization, dispersant or suspending agents are used in the polymerization process. Generally any suspending agent previously or conventionally employed in polymerization processes for ethylenically unsaturated monomers may be used, as long as it remains undecomposed at the polymerization temperature. Suspending agents such as methyl hydroxyalkyl cellulose or polyvinyl alcohol can be used in the process, for instance, at concentrations ranging from 0.0001 to 1.0%, based on weight of the monomer charge. The reaction can be started and maintained by the addition of any suitable initiator known for the polymerization of ethylenically unsaturated monomers including inorganic peroxides, organic peroxides and "redox" combinations of oxidizing and reducing agents. Examples of typical inorganic peroxides includes sodium, potassium or ammonium persulfate, which have useful activity in the 65° C. to 105° C. temperature range. Organic peroxides which can be used for the polymerization include alkyl, dialkyl, and diacyl peroxides, peroxydicarbonates, and peroxy esters. Di-t-butyl peroxide is an example of a dialkyl peroxide, t-butyl peroxypivalate and t-amyl peroxypivalate are examples of a peroxyester, and di (n-propyl) peroxydicarbonate, diisopropyl peroxydicarbonate, di (sec-butyl) peroxydicarbonate, and di (2-ethylhexyl) peroxydicarbonate, and di (2-ethylhexyl) peroxydicarbonate are examples of peroxydicarbonates. Halogenated free radical initiators such as chlorocarbon-based and fluorocarbon-based acyl peroxides can also be used in the polymerization. Examples of such initiators include trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)$—$[CF(CF_3)$ $CF_2O]_m$—$CF(CF_3)$—$COO\}2$ where m=0-8, $[ClCF_2(CF_2)_nCOO]_2$, and $[HCF_2 (CF_2)_n COO]_2$ where n=0-8; perfluoroalkyl azo compounds such as perfluoroazoisopropane, $[(CF_3)_2CFN=]_2$, $R^fN=NR^f$, where $R^f$ is a linear or branched perfluorocarbon group having 1-8 carbons; stable or hindered perfluoroalkane radicals such as hexafluoropropylene trimer radical, $[(CF_3)_2 CF]_2(CF_2CF_2)C$— radical; and perfluoroalkanes. "Redox" systems can operate at even lower temperatures. Examples of redox systems include combinations of oxidants such as hydrogen peroxide, t-butyl hydroperoxide, cumene hydroperoxide, or persulfate, with reductants such as reduced metal salts, iron (II) salts being a particular example, optionally combined with activators such as sodium formaldehyde sulfoxylate or ascorbic acid.

The quantity of an initiator required for a polymerization is related to its activity and the temperature used for the polymerization. The total amount of initiator used is generally from 0.01% to 5.0% by weight on the total monomer weight used. A mixture of one or more organic initiators as described above and one of more inorganic radical initiators as defined above, can be used to conduct the polymerization at a desirable rate. Typically, sufficient initiator is added at the beginning to start the reaction and then additional initiator may be optionally added to maintain the polymerization at a convenient or desired rate.

In addition to halogenated olefin monomer(s), halogenated co-monomer(s) selected from the group consisting of halogenated alkenyl ethers, halogenated alkenyl esters and halogenated (meth)acrylates, and optionally co-monomers other than such halogenated co-monomers, initiator, and surfactant, other typical additives used in the emulsion polymerization of unsaturated fluoromonomers may be added at typical levels. Chain transfer agents may be added to the polymerization to regulate the molecular weight of the copolymer product. They can be added to a polymerization in a single portion at the beginning of the reaction, or incrementally or continuously throughout the reaction. The amount of chain-transfer agent depends on the activity of the particular chain transfer agent, the monomer nature and activity, and on the desired molecular weight of copolymer product, with a range from 0.1 to 2 weight percent based on the total weight of monomer added to the reaction mixture being typical. Oxygenated compounds such as alcohols, carbonates, ketones, esters and ethers act as chain-transfer agents. Alkanes such as ethane and propane can also act as chain-transfer agents in the polymerization. A halogen-containing compound such as a halocarbon or hydrohalocarbon (e.g., trichlorofluoromethane) may serve as a chain-transfer agent. A halogenated alkenyl ether, halogenated alkenyl ester or halogenated (meth)acrylate co-monomer as defined above itself may also serve as a chain transfer agent. The additives which may be present during an aqueous media polymerization also include, but are not limited to paraffin antifoulants, buffering agents and other additives typically used in polymerizations involved unsaturated monomers.

The temperature of the polymerization can vary depending on the characteristics of the initiator used, but it is typically between 20° and 160° C., and most conveniently it is between 35° and 130° C., and most preferably from 50° and 120° C. The temperature is not limited to this range, however, and might be higher or lower if a high-temperature or low-temperature initiator is used. The pressure of the polymerization is typically between 280 and 20,000 kPa, depending on the capabilities of the reaction equipment, the initiator system chosen, and the monomer selection. The polymerization pressure is preferably between 2,000 and 11,000 kPa, and most preferably from 2750-7000 kPa.

The copolymers of the invention can be formulated as solvent dispersions, solvent solutions, aqueous dispersions, or as powder coatings, or in the form of powders, pellets, granules, sheets, films, extrudates, laminates or molded articles. The copolymers of the invention may be used as the sole polymeric component of such formulations, or they may be blended with other types of polymers which can serve to provide an additional fine tuning of the performance properties. Such formulations may contain additives typical for use in a coating, including but not limited to, pH adjustment agents, cosolvents, coalescents, plasticizers, UV stabilizers, colorants, dyes, filler, water-soluble resins, rheology control additives and thickeners, and pigments and pigment extenders. They may be useful as components of field-applied and factory applied coatings and paints, tank linings, anti-reflective coatings, caulks, sealants and adhesives, inks and varnishes, modifying resins for cements and mortars, consolidating agents, and stains; battery separators, binders for battery anodes or cathodes; medical devices or other products where biocompatibility may be advantageous; separators, piezoelectric devices, energy surge devices, capacitative elements or insulating elements for batteries, supercapacitors, and other electrical energy storage devices; photovoltaic devices; insulating or barrier layers (e.g., oxygen barrier layers); dielectric layers; tie layers; adhesive layers; conductive layers; packaging films; and membranes and other filtration devices. Formulations containing the copolymers of the invention are particularly useful when there are requirements of weatherability, electrochemical stability, chemical resistance, stain/oil resistance, and/or hydrophobicity/water resistance.

In particular, the copolymers of the present invention are using as components of coating compositions, either alone or in combination with other components (e.g., fillers, pigments, plasticizers, stabilizers, levelling agents, adhesion agents, coalescing agents, other polymers and the like). Coatings formed using the copolymers of the present invention may be low surface energy coatings. A coating composition comprised of a copolymer in accordance with the invention may be applied as a layer (or in the form of multiple layers) to a surface of a substrate, thereby imparting one or more desired attributes to the substrate surface (e.g., enhanced weatherability, enhanced appearance (such as gloss), enhanced fouling resistance, enhanced protection against chemical attack, solvents, corrosion, water or the like). Depending upon the characteristics of the copolymer and other components of the coating composition (if any) and the end result which is desired, the layer of the coating composition may be formed on the substrate surface in any suitable manner. For example, the copolymer may be dissolved in a suitable solvent or combination of solvents to provide a coating composition, which is then applied to a substrate surface using any appropriate method (spraying, dipping, or the like) to form a layer which is then dried (by heating, for example) to remove the solvent(s) and form a coating comprised of the copolymer. Alternatively, the copolymer may be suspended or dispersed in the form of fine particles in a liquid matrix comprised of a non-solvent for the copolymer (e.g., water) and the coating composition applied as a dispersion or suspension to a substrate surface and dried. Powder coating or extrusion coating techniques may also be utilized.

Copolymers of the present invention are also for forming sheets, films and the like, as well as molded and extruded articles. Blends, alloys and other mixtures of the copolymers of the present invention with one or more other polymers (including other copolymers) may also be prepared, such as blends with acrylic resins and the like. The copolymers may be compounded with any of the additives known in the polymer art including, but not limited to, colorants, stabilizers, fire retardants, plasticizers, adhesion modification agents, processing aids and the like.

Copolymers in accordance with the present invention can be used in a wide variety of applications. For example, the copolymers can be utilized as compatibilizing agents, foaming agents, surfactants, or low surface energy additives (for anti-stain, anti-soil, or anti-stick applications, for wetting or coating applications, and anti-fouling applications), to improve or enhance solvent or chemical resistance (in coatings, films, fabricated parts, etc.), in the preparation of oil and water repellant surfaces (for substrates such as plastics, textiles, paper, wood, leather, etc.), as coatings for medical devices, as lubricants, as additives and bulk materials for electronic applications, as or in thermoplastic elastomers, as impact modifiers, as adhesives, for drug (or pharmaceutical) delivery, in cosmetic applications, and many others as will be evident to those skilled in the art.

Copolymers in accordance with the present invention may be low surface energy polymers useful for modifying the surface energy of polymeric materials. These copolymers can be used in additive amounts or used as bulk materials. Additive amounts may be included in a wide variety of bulk polymers to impart properties such as stain resistance that are not inherent in the bulk polymers. Potential applications include food uses, textiles, coatings, pharmaceuticals, paints, and many other industries.

The copolymers provided by the present invention (including low surface energy copolymers) may be used in combination with any of the thermoplastic and thermosetting resins conventionally used in coating compositions. Of course, the specific resin or resins employed should be chosen to be appropriate for the coating application involved and should be compatible with the other components of the coating composition. Examples of useful resins include latexes, acrylic resins, vinyl acrylic resins, vinyl acetate resins, alkyd resins, polyester resins, polyurethane resins, epoxy resins, vinyl resins, phenoxy resins and the like. In the event that the final coating resin is to be a thermoset coating, the resin component includes an effective amount of a crosslinking component, e.g., at least one crosslinking agent, such as the conventionally used melamine/formaldehyde resins, urea/formaldehyde resins and the like. One or more such crosslinking agents are employed in combination with one or more other resins, referred to as thermosetting resins, in an amount effective to form crosslinks in the thermosetting resin or resins, e.g., upon the application of heat, to form the final desired thermoset surface coating.

Additionally, there exists a significant opportunity to utilize copolymers in accordance with the present invention as hydrophobic additives to provide repellency characteristics to coatings, fibers and films. A key aspect of such products is that they may be added during melt processing and thereby eliminate subsequent treatment steps. The most attractive applications for such hydrophobic additives are in textiles, coatings and films, and key product attributes in these applications are anti-stain, anti-smudge, and water repellent features. Copolymers in accordance with the present invention are expected to effectively function in a variety of applications involving the modification of the surface chemistry of polymeric articles. Currently, some fluorinated materials are used for such applications, but such fluorinated materials are under significant regulatory pressure to be phased out.

Areas of particular interest include, but are but not limited to: 1) repellency applications in the textile, coating and paint application, wherein copolymers in accordance with the present invention may be used for the preparation of stain and moisture repellent fibers, films, sheets, coatings and paints and the like for residential and commercial uses; 2) self-adhesive applications including release liners in particular, wherein release liners are coated for label stock and graphic arts markets, i.e., for calendered kraft papers and polyethylene-coated papers, and film liners; 3) mold release agents; 4) fluorochemical surfactants; 5) printable/paintable polyolefins; 6) protective window treatments; 7) antigraffiti coatings; 8) aircraft coatings; 9) anticondensate additives; and 10) abrasion resistance additives.

ILLUSTRATIVE ASPECTS OF THE INVENTION

Various exemplary, non-limiting aspects of the present invention may be summarized as follows:

Aspect 1: A copolymer of a) at least one halogenated olefin and b) at least one halogenated co-monomer selected from the group consisting of halogenated alkenyl ethers, halogenated alkenyl esters, and halogenated (meth)acrylates.

Aspect 2: The copolymer of Aspect 1, wherein the at least one halogenated olefin comprises a halogenated olefin represented by formula (1):

$$CX^1X^2=CX^3X^4 \qquad (1)$$

wherein the halogenated olefin comprises at least one halogen atom and $X^1$, $X^2$, $X^3$ and $X^4$ are independently selected from a hydrogen atom, a chlorine atom, a fluorine atom, or a halogenated or non-halogenated alkyl group having 1 to 8 carbon atoms.

Aspect 3: The copolymer of Aspect 2, wherein the halogenated olefin comprises at least one fluorine atom.

Aspect 4: The copolymer of Aspect 2, wherein the halogenated olefin comprises at least one halogen atom which is selected from the group consisting of a fluorine atom and a chlorine atom and which is bonded to at least one carbon atom participating in a carbon-carbon double bond in the halogenated olefin.

Aspect 5: The copolymer of any of Aspects 1 to 4, wherein the at least one halogenated olefin comprises a halogenated olefin selected from the group consisting of $CClF=CF_2$, $CH_2=CF_2$, $CFH=CH_2$, $CF_2=CHF$, $CF_2=CF_2$, $CHF=CHF$, $CF_3CF=CH_2$, $CF_2=CHCl$, $CF_3CH=CHF$, $CClF=CH_2$, $CF_2=CF_2$, $CF_3CCl=CH_2$, $CF_3CH=CHCl$, $CF_3CF=CFH$, $CF_3CH=CF_2$, $CF_3CF=CFCF_3$, $CF_3CF_2CF=CF_2$, $CF_3CH=CHCF_3$, $CF_2HCH_2CF=CH_2$, $CF_2HCH_2CF=CClH$, $CF_2HCH=CFCH_2Cl$ and $CF_3—CF=CF_2$.

Aspect 6: The copolymer of any of Aspects 1 to 5, wherein the at least one co-monomer comprises at least one halogenated alkenyl ether comprised of at least one fluorine atom.

Aspect 7: The copolymer of any of Aspects 1 to 6, wherein the at least one co-monomer comprises a halogenated alkenyl ether represented by formula (2):

$$CX^5X^6=CX^7—OR^1 \qquad (2)$$

wherein the halogenated alkenyl ether comprises at least one halogen atom, $X^5$, $X^6$ and $X^7$ are independently selected from a hydrogen atom, a chlorine atom, a fluorine atom, or a halogenated or non-halogenated alkyl group having 1 to 8 carbon atoms, and $R^1$ is a halogenated or non-halogenated alkyl group having 1 to 8 carbon atoms and optionally substituted by at least one hydroxyl group.

Aspect 8: The copolymer of Aspect 7, wherein $R^1$ is represented by formula (3):

$$C_aH_bF_cCl_d \qquad (3)$$

wherein a is an integer of from 1 to 8, b is 0 or an integer of from 1 to 2a+1, c is 0 or an integer of from 1 to 2a+1, d is 0 or an integer of from 1 to 2a+1, and b+c+d is 2a+1.

Aspect 9: The copolymer of Aspect 8, wherein at least one of c or d is an integer of from 1 to 2a+1.

Aspect 10: The copolymer of any of Aspects 1 to 9, wherein the at least one co-monomer comprises a halogenated alkenyl ether selected from the group consisting of $CF_3-C(OR^1)=CH_2$, $CF_3C(OR^1)=CFH$, $CF_3C(OR^1)=CF_2$, $CF_3-CH=CH(OR^1)$, $CF_3CF=CF(OR^1)$, $CF_3CF=CH(OR^1)$, $CF_3CH=CF(OR^1)$, $CF(OR^1)=CHCl$, $CF(OR^1)=CH_2$, $CF(OR^1)=CFCl$, $CF(OR^1)=CFH$, $CF(OR^1)=CCl_2$, $CF_2=CF(OR^1)$, $CF_3C(OR^1)=CFCF_3$, $CF_3CH=C(OR^1)CH_3$, $CF_3CH_2C(OR^1)=CH_2$, $CF_3C(OR^1)=CHCF_3$, $CF(OR^1)=CFCF_2CF_2H$, $CF_3CF_2C(OR^1)=CH_2$, $CF_3CF_2CF(CF_3)C(OR^1)=CH$; $CH_3CH_2CH=CF(OR^1)$; $CF_3C(OR^1)=CFCF_2CF_3$, $CF_3CF=C(OR^1)CF_2CF_3$; $(CF_3)_2CFC(OR^1)=CH_2$, $CF_3CF_2CF_2C(OR^1)=CH_2$, $CF_3CF_2C(OR^1)=CFCF_3$, $CF_3CF_2CF_2CF=C(OR^1)CF_3$, $F(CF_2)_5CF=CF(OR^1)$, $C_4F_9C(OR^1)=CFCF_3$, $C_4F_9CF=C(OR^1)CF_3$, $F(CF_2)_6CF=CF(OR^1)$, $F(CF_2)_5C(OR^1)=CFCF_3$, and $F(CF_2)_5CF=C(OR^1)CF_3$, wherein $R^1$ is a halogenated or non-halogenated alkyl group having 1 to 8 carbon atoms.

Aspect 11: The copolymer of Aspect 1, wherein the at least one co-monomer comprises at least one halogenated hydroxy alkenyl ether (i.e., wherein at least one co-monomer is a halogenated alkenyl ether which is hydroxyl-substituted).

Aspect 12: The copolymer of Aspect 11, wherein the at least one halogenated hydroxy alkenyl ether comprises a halogenated hydroxy alkenyl ether represented by formula (4):

$$CX^8X^9=CX^{10}-O-R^2-OH \quad (4)$$

wherein $X^8$, $X^9$ and $X^{10}$ are independently selected from a hydrogen atom, a chlorine atom, a fluorine atom, or a halogenated or non-halogenated alkyl group having 1 to 8 carbon atoms, and $R^2$ is a halogenated or non-halogenated alkyl group having 2 to 13 carbon atoms, which may optionally contain one or more functional groups selected from carbonyl or ether functional groups and which may be substituted or unsubstituted.

Aspect 13: The copolymer of Aspect 12, wherein —$R^2$—OH is selected from the group consisting of hydroxyethyl, hydroxypropyl, hydroxybutyl, hydroxypentyl, hydroxyhexyl, hydroxyoctyl, hydroxydecyl, hydroxylauryl, hydroxycyclobutyl, hydroxycyclopentyl, hydroxycyclohexyl, a polyethylene glycol residue, a polypropylene glycol residue, a polyethylene/polypropylene glycol residue, a glycerol residue, an alkoxylated glycerol residue, a sugar residue, an alkoxylated sugar residue, a trimethylolpropane residue, an alkoxylated trimethylolpropane residue, a pentaerythritol residue, an alkoxylated pentaerythritol residue, a dipentaerythritol residue, an alkoxylated dipentaerythritol residue, an alpha-glucoside residue, an alkoxylated alpha-glucoside residue, a trimethylolethane residue, an alkoxylated trimethylolethane residue, a sugar alcohol residue, an alkoxylated sugar alcohol residue, an alkanol amine residue, and an alkoxylated amine residue.

Aspect 14: The copolymer of any of Aspects 1 to 13, wherein the at least one co-monomer is comprised of at least one halogenated (meth)acrylate.

Aspect 15: The copolymer of any of Aspects 1 to 14, wherein the at least one co-monomer is comprised of at least one fluorinated (meth)acrylate.

Aspect 16: The copolymer of any of Aspects 1 to 15, wherein the at least one co-monomer is comprised of at least one halogenated alkenyl ester.

Aspect 17: The copolymer of any of Aspects 1 to 16, wherein the at least one co-monomer is comprised of at least one fluorinated alkenyl ester.

Aspect 18: The copolymer of any of Aspects 1 to 17, having a number average molecular weight of from 5000 to 1,500,000 daltons as measured by gel permeation chromatography using polystyrene standards.

Aspect 19: The copolymer of any of Aspects 1 to 18, wherein the copolymer is a random, alternating, gradient or block copolymer.

Aspect 20: The copolymer of any of Aspects 1 to 19, wherein the copolymer is comprised of from 1 to 99% by weight halogenated olefin and from 99 to 1% by weight halogenated co-monomer in polymerized form.

Aspect 21: A method of making a copolymer in accordance with any of Aspects 1 to 20, comprising copolymerizing a monomer mixture comprised of a) at least one halogenated olefin and b) at least one co-monomer selected from the group consisting of halogenated alkenyl ethers, halogenated alkenyl esters and halogenated (meth)acrylates.

Aspect 22: An article, comprising a substrate having a surface and a coating comprised of a copolymer in accordance with any of Aspects 1 to 20 on at least a portion of the surface of the substrate.

Aspect 23: A battery electrode binder, comprising a copolymer in accordance with any of Aspects 1 to 20 and at least one nonaqueous solvent.

Aspect 24: A battery, comprising at least one electrode comprising an electrode active material and a copolymer in accordance with any of Aspects 1 to 20.

Aspect 25: A polymeric product obtained by reacting a copolymer in accordance with any of Aspects 1 to 20, wherein the copolymer comprises one or more halogenated hydroxy alkenyl ethers in polymerized form, with at least one hydroxyl-reactive substance.

Aspect 26: An article of manufacture comprising at least one copolymer in accordance with any of Aspects 1 to 20, wherein the article of manufacture is selected from the group consisting of coatings, paints, adhesives, sealants, fibers, molded articles, films, sheets, composites and laminates.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the copolymer, method for making the copolymer or process using the copolymer. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Scope

Computational modeling was used to study the propagation kinetics of free radical polymerization of vinylidene difluoride (VF2) monomer and a series of fluorinated alkenyl ether monomers in vacuum to indicate the feasibility of polymer growth and predict the relationship between the composition of unreacted monomer and polymer chain structure. The study did not quantify initiation, termination, or chain transfer kinetics, so molecular weight cannot be inferred. Molecular weight is a function of solvent used, reaction temperature, initiator and monomer concentration, and presence and concentration of chain transfer agents. Ideally, the predicted results in vacuum should be paired with an experimental design to optimize the reaction conditions needed to produce each polymer once feasibility is established by the model.

Methodology

The calculations mapped the propagation kinetics of a free radical poly(vinylidene difluoride) PVDF chain-end in the presence of unreacted VF2 and fluorinated alkenyl ether by quantifying each step of monomer addition, as listed in Tables 1 and 2. All propagation reactions represent the growing PVDF chain as a single monomer repeat unit (n=1) to lower computational cost with little effect on the reaction kinetics given the electronic structure of PVDF and fluorovinylether itself are localized. The reaction rate constant follows an Arrhenius relation, which combines a prefactor with an exponential term that includes the activation energy of the reaction. The prefactor signifies the attempt frequency of the reaction, specifically, the translational, rotational, and vibrational energy of the ground state of the reactants [4, 5]. Overall, the rate of reaction is a product of the reaction rate constant and molar concentration of each of the monomers and free radical chain ends. The reaction scheme did not include head-head or tail-tail defects, which are rare in the case of PVDF homopolymerization [7]. In all calculations, the methylene end of the unreacted monomer ($CH_2$) reacts with the free radical chain end.

All calculations were performed in GAMESS [1] using density functional theory with the B3LYP functional and 6-31G(d,p) basis set. Transition state structures were optimized using the default saddle point optimization routine, and normal mode analysis [6] performed to confirm transition states by identifying the existence of a single imaginary frequency of 400 $cm^{-1}$ or greater. A counterpoise correction was applied to remove basis set superposition error in the transition state [2, 3], and the activation energy was calculated as the difference between the transition state and reactant energies.

Results and Discussion

The rate of reaction (relative to VF2), activation energy, and prefactor at 25 and 100° C. are given in Tables 1 and 2. The order of reactivity for fluorovinylmethylether (FVME) and VF2 propagation suggests an initial free radical PVDF chain end will quickly propagate with FVME and continue to homopolymerize to form continuous blocks of FVME. On complete consumption of unreacted FVME, the model predicts the forming of a second continuous block of VF2. Because the propagation of a free radical FVME chain end with FVME is approximately four times more likely than propagation with VF2, the likelihood of propagation with alternating monomer addition is low in vacuum. Although the effect of propagation in solvent was not considered in this study, the use of solvent will lower the prefactor by imposing greater restrictions in translation, rotational, and vibrational movement of the reactants and transition state. The experimental selection of solvents to affect the order of reactivity beyond the baseline calculated values in vacuum will likely be necessary to engineer block or random co-polymers. In contrast, the order of reactivity for fluorovinylethylether (FVEE) and VF2 propagation suggests an initial PVDF free radical chain end will propagate almost equally with VF2 or FVEE (rate of reactions of 0.55 and 0.58, respectively), but a FVEE free radical chain end will propagate 80 times more likely with VF2 than with FVEE, suggesting FVEE blocks of any significant length beyond 1 become exponentially rare, given an abundant supply of both monomers. The effect of the ethyl substitution on the reaction clearly raises the activation energy of fluorovinylether homopolymerization significantly, suggesting methyl substituted fluorovinylethers are more reactive monomers. This also implies the addition of solvent may not materially impact the reactivity of fluorovinylethylether, given the significantly smaller baseline reactivity in vacuum.

No effect of temperature was found on the order of reactivity of each of the propagation schemes involving FVME or FVEE. At 25 and 100° C., the relative reaction rates are very similar, although the absolute reaction rates are overall 20 times faster at the higher temperature. This suggests temperature alone may not affect the order of reactivity to produce specific sequences in the polymer chain, but rather the tuning of the polymer sequence may require a combination of temperature control and selection of solvent.

The effect of the length of the alkyl substitution in a fluorinated alkenyl ether appears significant up to the propyl group. Beyond propyl, the rate of reaction (relative to VF2) appears constant and unaffected by the added length of the alkyl chain. This suggests additional functionalization at the end of a long alkyl chain (for example hydroxyl, amine, or fluorinated groups) may be engineered without affecting the order of reaction, and subsequently the polymer structure, whether block or alternating.

TABLE 1

Simulated propagation kinetics of VF2 monomer and fluorovinylalkylether at 25° C.

| Chain end | New monomer | Relative Rate of Reaction | E kcal/mol | Pre-factor $s^{-1}M^{-1}$ |
|---|---|---|---|---|
| —[$CH_2$—$CF_2$]$_n$-$CH_2$—$CF_2$• | $CH_2$=$CF_2$ | 1 | 8.5 | 9.8E+05 |
| —[$CH_2$—$CF_2$]$_n$-$CH_2$—$CF_2$• | $CH_2$=$CF(OCH_3)$ | 3.2 | 7.7 | 8.4E+05 |
| —[$CH_2$—$CF_2$]$_n$-$CH_2$—$CF_2$• | $CH_2$=$CF(OCH_2CH_3)$ | 0.95 | 7.5 | 1.7E+05 |
| —[$CH_2$—$CF_2$]$_n$-$CH_2$—$CF_2$• | $CH_2$=$CF(OCH_2CH_2CH_3)$ | 0.19 | 7.7 | 4.7E+04 |
| —[$CH_2$—$CF_2$]$_n$-$CH_2$—$CF_2$• | $CH_2$=$CF(OCH_2CH_2CH_2CH_3)$ | 0.17 | 7.7 | 4.4E+04 |
| —[$CH_2$—$CF_2$]$_n$-$CH_2$—$CF(OCH_3)$• | $CH_2$=$CF(OCH_3)$ | 0.036 | 9.3 | 1.4E+05 |
| —[$CH_2$—$CF_2$]$_n$-$CH_2$—$CF(OCH_2CH_3)$• | $CH_2$=$CF(OCH_2CH_3)$ | 0.00019 | 12.6 | 1.9E+05 |
| —[$CH_2$—$CF_2$]$_n$-$CH_2$—$CF(OCH_3)$• | $CH_2$=$CF_2$ | 0.0098 | 11.3 | 1.1E+06 |
| —[$CH_2$—$CF_2$]$_n$-$CH_2$—$CF(OCH_2CH_3)$• | $CH_2$=$CF_2$ | 0.015 | 10.6 | 5.1E+05 |

TABLE 2

Simulated propagation kinetics of VF2 monomer and fluorovinylalkylether at 100° C.

| Chain end | New monomer | Relative Rate of Reaction | E kcal/mol | Pre-factor $s^{-1}M^{-1}$ |
|---|---|---|---|---|
| —[CH$_2$—CF$_2$]$_n$-CH$_2$—CF$_2$• | CH$_2$=CF$_2$ | 1 | 8.5 | 1.6E+06 |
| —[CH$_2$—CF$_2$]$_n$-CH$_2$—CF$_2$• | CH$_2$=CF(OCH$_3$) | 2.5 | 7.7 | 1.3E+06 |
| —[CH$_2$—CF$_2$]$_n$-CH$_2$—CF$_2$• | CH$_2$=CF(OCH$_2$CH$_3$) | 0.69 | 7.5 | 2.7E+05 |
| —[CH$_2$—CF$_2$]$_n$-CH$_2$—CF$_2$• | CH$_2$=CF(OCH$_2$CH$_2$CH$_3$) | 0.14 | 7.7 | 7.0E+04 |
| —[CH$_2$—CF$_2$]$_n$-CH$_2$—CF$_2$• | CH$_2$=CF(OCH$_2$CH$_2$CH$_2$CH$_3$) | 0.13 | 7.7 | 6.6E+04 |
| —[CH$_2$—CF$_2$]$_n$-CH$_2$—CF(OCH$_3$)• | CH$_2$=CF(OCH$_3$) | 0.046 | 9.3 | 2.1E+05 |
| —[CH$_2$—CF$_2$]$_n$-CH$_2$—CF(OCH$_2$CH$_3$)• | CH$_2$=CF(OCH$_2$CH$_3$) | 0.00081 | 12.6 | 3.1E+05 |
| —[CH$_2$—CF$_2$]$_n$-CH$_2$—CF(OCH$_3$)• | CH$_2$=CF$_2$ | 0.027 | 11.3 | 1.8E+06 |
| —[CH$_2$—CF$_2$]$_n$-CH$_2$—CF(OCH$_2$CH$_3$)• | CH$_2$=CF$_2$ | 0.036 | 10.6 | 9.4E+05 |

Validation—VF2 and 1234yf Reactivity

Emulsion polymerization of VF2 and 1234yf was performed at 83° C. and 650 psi. Calculations of vacuum polymerization of the same two monomers were performed, which found the reactivity ratios to be similar. Both experimental results and simulated predictions show 1234yf to be more reactive than VF2.

Experimental Reactivity at 83° C. with Solvent (Triblock Surfactant):

$k_{VF2\text{-}VF2}/k_{VF2\text{-}yf} = 0.4$ $k_{yf\text{-}yf}/k_{VF2\text{-}yf} = 2.7$ Simulated Reactivity at 25° C. in Vacuum:

$k_{VF2\text{-}VF2}/k_{VF2\text{-}yf} = 0.46$ $k_{yf\text{-}yf}/k_{VF2\text{-}yf} = 1.1$

TABLE 3

Simulated propagation kinetics of VF2 monomer and 1234yf monomer at 25° C.

| Chain end | New monomer | Relative Rate of Reaction | E kcal/mol | Pre-factor $s^{-1}M^{-1}$ |
|---|---|---|---|---|
| —[CH$_2$—CF$_2$]$_n$-CH$_2$—CF$_2$• | CH$_2$=CF$_2$ | 1 | 8.5 | 9.8E+05 |
| —[CH$_2$—CF$_2$]$_n$-CH$_2$—CF$_2$• | CH$_2$=CF(CF$_3$) | 2.02 | 6.3 | 4.6E+04 |
| —[CH$_2$—CF$_2$]$_n$-CH$_2$—CF(CF$_3$)• | CH$_2$=CF$_2$ | 0.0064 | 10.1 | 9.9E+04 |
| —[CH$_2$—CF$_2$]$_n$-CH$_2$—CF(CF$_3$)• | CH$_2$=CF(CF$_3$) | 0.0071 | 9.4 | 3.0E+04 |

REFERENCES

1. M. W. Schmidt, K. K. Baldridge, J. A. Boatz, S. T. Elbert, M. S. Gordon, J. H. Jensen, S. Koseki, N. Matsunaga, K. A. Nguyen, S. Su, T. L. Windus, M. Dupuis, J. A. Montgomery, J. Comput. Chem., 1993, 14, 1347-1363.
2. S. F. Boys and F. Bernardi, Mol. Phys., 1970, 19, 553-566.
3. S. Simon, M. Duran and J. J. Dannenberg, J. Chem. Phys., 1996, 105, 11024-11031.
4. D. G. Trulhar, A. D. Isaacson and B. C. Garrett, in Theory of Chemical Reaction Dynamics, ed. M. Baer, CRC Press, Boca Raton, 1985, pp. 65-137.
5. Fernandez-Ramos, B. Ellingson, R. Meana-Paneda, J. G. C. Marques and D. G. Truhlar, Theor. Chem. Acc., 2007, 118, 813-826.
6. H. B. Schlegel, J. Comput. Chem., 1982, 3, 214-218.
7. P. Laflamme, F. Porzio, B. Ameduri, A. Soldera, Polym. Chem. 2012, 3, 652.

What is claimed is:

1. A copolymer of a) at least one halogenated olefin represented by the formula $CX^1X^2=CX^3X^4$ wherein the halogenated olefin comprises at least one halogen atom and $X^1$, $X^2$, $X^3$ and $X^4$ are independently selected from a hydrogen atom, a chlorine atom, a fluorine atom, or a halogenated or non-halogenated alkyl group having 1 to 8 carbon atoms, and b) at least one halogenated alkenyl ethers represented by the formula $CX^5X^6=CX^7—OR^1$ wherein $X^5$, $X^6$ and $X^7$ are independently selected from a hydrogen atom, a chlorine atom, a fluorine atom, or a halogenated or non-halogenated alkyl group having 1 to 8 carbon atoms and at least one of $X^5$, $X^6$ and $X^7$ is halogen or fluoralkyl and at least one of $X^5$, $X^6$ and $X^7$ is hydrogen, and $R^1$ is a non-halogenated alkyl group having 1 to 8 carbon atoms and substituted by at least one hydroxyl group, which may optionally contain one or more functional groups selected from carbonyl or ether functional groups and which may be substituted or unsubstituted wherein said halogenated alkenyl ether comprise at least one halogenated hydroxy alkenyl ether.

2. The copolymer of claim 1, wherein the halogenated olefin comprises at least one fluorine atom.

3. The copolymer of claim 1, wherein the halogenated olefin comprises at least one halogen atom which is selected from the group consisting of a fluorine atom and a chlorine atom and which is bonded to at least one carbon atom participating in a carbon-carbon double bond in the halogenated olefin.

4. The copolymer of claim 1, wherein the at least one halogenated olefin comprises a halogenated olefin selected from the group consisting of CClF=CF$_2$, CH$_2$=CF$_2$, CFH=CH$_2$, CF$_2$=CHF, CF$_2$=CF$_2$, CHF=CHF, $CF_3CF=CH_2$, $CF_2=CHCl$, $CF_3CH=CHF$, $CClF=CH_2$, $CF_3CCl=CH_2$, $CF_3CH=CHCl$, $CF_3CF=CFH$, $CF_3CH=CF_2$, $CF_3CF=CFCF_3$, $CF_3CF_2CF=CF_2$, $CF_3CH=CHCF_3$, $CF_2HCH_2CF=CH_2$, $CF_2HCH_2CF=CClH$, $CF_2HCH=CFCH_2Cl$ and $CF_3—CF=CF_2$.

5. The copolymer of claim 1, wherein the at least one co-monomer comprises at least one halogenated alkenyl ether comprised of at least one fluorine atom.

6. The copolymer of claim 1, wherein the at least one co-monomer comprises a halogenated alkenyl ether selected from the group consisting of $CF_3—C(OR^1)=CH_2$, $CF_3C(OR^1)=CFH$, $CF_3—CH=CH(OR^1)$, $CF_3CF=CH(OR^1)$, $CF_3CH=CF(OR^1)$, $CF(OR^1)=CHCl$, $CF(OR^1)=CH_2$, $CF(OR^1)=CFH$, $CF_3CH=C(OR^1)CH_3$, $CF_3CH_2C(OR^1)=CH_2$, $CF_3C(OR^1)=CHCF_3$, $CF_3CF_2C(OR^1)=CH_2$, $CF_3CF_2CF(CF_3)C(OR^1)=CH$, $CH_3CH_2CH=CF(OR^1)$, $(CF_3)_2CFC(OR^1)=CH_2$, and $CF_3CF_2CF_2CF_2C(OR^1)=CH_2$.

7. The copolymer of claim 1, wherein the at least one halogenated hydroxy alkenyl ether comprises a halogenated hydroxy alkenyl ether represented by formula (4):

$$CX^8X^9=CX^{10}—O—R^2—OH \quad (4)$$

wherein $X^8$, $X^9$ and $X^{10}$ are independently selected from a hydrogen atom, a chlorine atom, a fluorine atom, or a halogenated or non-halogenated alkyl group having 1 to 8 carbon atoms, provided that at least one of $X^8$, $X^9$ or $X^{10}$ is a halogen or a halogenated alkyl group, and $R^2$ is a non-halogenated alkyl group having 1 to 8 carbon atoms.

8. The copolymer of claim 7, wherein $—R^2—OH$ is selected from the group consisting of hydroxyethyl, hydroxypropyl, hydroxybutyl, hydroxypentyl, hydroxyhexyl, hydroxyoctyl, hydroxycyclobutyl, hydroxycyclopentyl, hydroxycyclohexyl, a polyethylene glycol residue, a polypropylene glycol residue, a polyethylene/polypropylene glycol residue, a glycerol residue, an alkoxylated glycerol residue, a sugar residue, an alkoxylated sugar residue, a trimethylolpropane residue, an alkoxylated trimethylolpropane residue, a pentaerythritol residue, an alkoxylated pentaerythritol residue, a dipentaerythritol residue, an alkoxylated dipentaerythritol residue, an alpha-glucoside residue, an alkoxylated alpha-glucoside residue, a trimethylolethane residue, an alkoxylated trimethylolethane residue, a sugar alcohol residue, an alkoxylated sugar alcohol residue, an alkanol amine residue, and an alkoxylated amine residue.

9. The copolymer of claim 1, having a number average molecular weight of from 5000 to 1,00,000 daltons as measured by gel permeation chromatography using polystyrene standards.

10. The copolymer of claim 1, wherein the copolymer is a random, alternating, gradient or block copolymer.

11. The copolymer of claim 1, wherein the copolymer is comprised of from 1 to 99% by weight halogenated olefin and from 99 to 1% by weight halogenated alkenyl ether co-monomer in polymerized form.

12. An article, comprising a substrate having a surface and a coating comprised of a copolymer in accordance with claim 1 on at least a portion of the surface of the substrate.

13. A battery electrode binder, comprising a copolymer in accordance with claim 1 and at least one nonaqueous solvent.

14. A battery, comprising at least one electrode comprising an electrode active material and a copolymer in accordance with claim 1.

15. A polymeric product obtained by reacting a copolymer in accordance with claim 1, wherein the copolymer comprises one or more halogenated hydroxy alkenyl ethers in polymerized form, with at least one hydroxyl-reactive substance.

16. An article of manufacture comprising at least one copolymer in accordance with claim 1, wherein the article of manufacture is selected from the group consisting of coatings, paints, adhesives, sealants, fibers, molded articles, films, sheets, composites and laminates.

* * * * *